United States Patent
Watanabe et al.

(10) Patent No.: US 7,461,634 B2
(45) Date of Patent: Dec. 9, 2008

(54) FUEL INJECTION AMOUNT CORRECTION METHOD FOR PRESSURE BOOSTING FUEL INJECTION APPARATUS

(75) Inventors: Yoshimasa Watanabe, Sunto-gun (JP); Ichiro Sakata, Susono (JP); Yoshifumi Wakisaka, Aichi-gun (JP); Yoshihiro Hotta, Nagoya (JP); Kiyomi Kawamura, Nisshin (JP); Kiyomi Nakakita, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 239 days.

(21) Appl. No.: 10/557,335
(22) PCT Filed: Feb. 24, 2005
(86) PCT No.: PCT/IB2005/000473
§ 371 (c)(1),
(2), (4) Date: Nov. 21, 2005
(87) PCT Pub. No.: WO2005/093247
PCT Pub. Date: Oct. 6, 2005

(65) Prior Publication Data
US 2007/0089710 A1    Apr. 26, 2007

(30) Foreign Application Priority Data
Mar. 1, 2004    (JP) .................... 2004-056359

(51) Int. Cl.
*F02M 57/02*    (2006.01)
*F02M 51/00*    (2006.01)
(52) U.S. Cl. .................... 123/446; 123/478
(58) Field of Classification Search ............. 123/467, 123/446, 456, 494, 478
See application file for complete search history.

(56) References Cited

U.S. PATENT DOCUMENTS

| | | | |
|---|---|---|---|
| 6,684,856 B2* | 2/2004 | Tanabe et al. ............... | 123/447 |
| 7,165,527 B2* | 1/2007 | Okude et al. ............... | 123/299 |
| 2003/0183198 A1 | 10/2003 | Mahr et al. | |
| 2003/0213470 A1 | 11/2003 | Kohketsu et al. | |

(Continued)

FOREIGN PATENT DOCUMENTS

EP    0 691 471 A1    1/1996

(Continued)

*Primary Examiner*—Stephen K. Cronin
*Assistant Examiner*—Arnold Castro
(74) *Attorney, Agent, or Firm*—Oliff & Berridge PLC

(57) ABSTRACT

A pressure boosting unit (110) is provided in each fuel injection valve of an engine (1). A pressure of fuel to be supplied to the fuel injection valve from a common rail (3) is boosted as required. An ECU (20) causes low pressure injection to be performed with the pressure boosting unit 110 being in a non-operated state, and high pressure injection to be performed with the pressure boosting unit (110) being in an operated state, and the pressure of the fuel being maintained at a boosted pressure. Based on the result, the ECU (20) corrects a fuel injection period of the fuel injection valve. Also, after the correction of the fuel injection period is completed, fuel injection is performed before the pressure of the fuel reaches the boosted pressure after the pressure boosting unit starts to be operated. Based on the result, operation starting timing of the pressure boosting unit is adjusted.

16 Claims, 8 Drawing Sheets

U.S. PATENT DOCUMENTS

2004/0194756 A1    10/2004    Hotta et al.
2004/0194762 A1    10/2004    Okamoto

FOREIGN PATENT DOCUMENTS

| | | |
|---|---|---|
| EP | 1 284 357 A1 | 2/2003 |
| JP | A 58-124028 | 7/1983 |
| JP | A-2-5736 | 1/1990 |
| JP | B2 2526620 | 6/1996 |
| JP | B2 2885076 | 2/1999 |
| JP | A-2000-110627 | 4/2000 |
| JP | A-2000-130238 | 5/2000 |
| JP | A-2001-140687 | 5/2001 |
| JP | EP 1 243 787 A2 | 9/2002 |
| JP | A 2002-539372 | 11/2002 |
| JP | A 2002-364484 | 12/2002 |
| JP | A-2003-322050 | 11/2003 |
| JP | A 2004-44493 | 2/2004 |
| JP | A 2004-44494 | 2/2004 |
| WO | WO 00/55496 | 9/2000 |

* cited by examiner

FUEL INJECTION AMOUNT CORRECTION METHOD FOR PRESSURE BOOSTING FUEL INJECTION APPARATUS

BACKGROUND OF THE INVENTION

1. Field of the Invention

The invention relates to a method of correcting a fuel injection amount in a fuel injection apparatus when fuel is injected, and more particularly to a fuel injection amount correction method for a pressure boosting fuel injection apparatus which includes pressure boosting means, and in which a pressure of fuel supplied from a common rail is increased, and the fuel is injected from a fuel injection valve.

2. Description of the Related Art

A so-called common rail fuel injection apparatus is generally known, in which high pressure fuel supplied from a fuel pump is stored in a common rail (an accumulator), the fuel is supplied to an in-cylinder fuel injection valve provided in each cylinder of an internal combustion engine so that the fuel is injected directly into a combustion chamber of each cylinder.

In the common rail fuel injection apparatus, a pressure in the common rail can be controlled to a given value. Therefore, a rate of injection from a fuel injection valve can be controlled to an appropriate value according to an engine operating state so that a good combustion state can be maintained in the cylinder, irrespective of the engine operating state.

Particularly, in a direct injection diesel engine, a fuel injection period during which fuel is injected into the cylinder is limited. Meanwhile, in the common rail fuel injection apparatus, a fuel injection pressure can be maintained at a high value irrespective of an engine rotational speed. Therefore, by using the common rail fuel injection apparatus, it is possible to supply a large amount of fuel into the combustion chamber in a short time so that a high rotational speed and high output can be achieved in the diesel engine.

Meanwhile, since supercharging is generally performed in diesel engines, it is required to further increase the output of the diesel engine by increasing the fuel injection amount and using the supercharging, and accordingly it is required to further intensify the fuel injection pressure.

However, in the common rail fuel injection apparatus, the fuel injection pressure has been already set to a high value (e.g., approximately 180 MPa) that is close to a limit value. Therefore, in order to further increase the fuel pressure, it is necessary to increase a designed pressure of all elements of a fuel injection system such as the fuel pump, the common rail, and delivery pipes. However, it is not practical to increase the designed pressure of all the elements of the fuel injection system, considering problems such as an increase in cost and a decrease in reliability.

Accordingly, in order to solve the problems, a pressure boosting common rail fuel injection apparatus is proposed. In the pressure boosting common rail fuel injection apparatus, a fuel pressure in a common rail is set to a value that is substantially equal to, or lower than a fuel pressure in a conventional apparatus, and a pressure boosting device is employed for further increasing the pressure of fuel supplied to a fuel injection valve from the common rail at a portion that is closest as possible to a nozzle hole of the fuel injection valve.

In the pressure boosting common rail fuel injection apparatus, since the pressure boosting device is used for further increasing the pressure of the fuel supplied to the fuel injection valve from the common rail, the actual fuel injection pressure of the fuel injection valve can be set to a higher value (e.g., approximately 250 MPa) though the designed pressure of the elements such as the fuel pump and the common rail is set to a value that is substantially equal to (or lower than) the designed pressure in the conventional apparatus. Therefore, it is possible to boost the fuel injection pressure while suppressing a large increase in the cost.

Published Japanese Translation of PCT application No. JP-T-2002-539372 discloses an example of such a pressure boosting common rail fuel injection apparatus using such a fuel boosting device.

In the pressure boosting common rail fuel injection apparatus disclosed in the Published Japanese Translation of PCT application No. JP-T-2002-539372, a pressure boosting unit including a pressure boosting piston is used as a pressure boosting device. The pressure boosting unit is provided between a common rail and a nozzle hole of a fuel injection valve. The pressure boosting piston is formed by connecting a pressure receiving piston with a large diameter, and a pressurizing piston with a small diameter. The pressure boosting piston pressurizes the fuel according to an area ratio between the pressure receiving piston and the pressurizing piston. That is, in the pressure boosting piston, the fuel pressure in the common rail is applied to the pressure receiving piston with the large diameter, whereby the fuel supplied to a pressurizing chamber from the common rail is pressurized by the pressurizing piston with the small diameter. Thus, the pressure of the fuel supplied to the fuel injection valve can be increased to a value higher than the fuel pressure in the common rail, which is decided according to the area ratio between the piston having the large diameter and the piston having the small diameter.

In the pressure boosting common rail fuel injection apparatus disclosed in the Published Japanese Translation of PCT application No. JP-T-2002-539372, the pressure boosting device is provided in each fuel injection valve, whereby the fuel injection pressure is increased while suppressing a large increase in the cost.

However, a problem may occur when the pressure boosting common rail fuel injection apparatus disclosed in the Published Japanese Translation of PCT application No. JP-T-2002-539372 is applied to a multi-cylinder internal combustion engine.

In the multi-cylinder internal combustion engine, when torque generated in a cylinder is deviated, the output of the engine may fluctuate, or combustion noise, vibration, or the like may occur. Therefore, it is necessary to minimize the deviation of the amount of fuel supplied to each cylinder, and to make the amount of fuel supplied to each cylinder uniform. Therefore, in the multi-cylinder internal combustion engine, an injection characteristic of the fuel injection valve in each cylinder is adjusted so as to be in a predetermined tolerance, whereby the deviation of the fuel injection amount in each cylinder is reduced.

However, in the pressure boosting common rail fuel injection apparatus, the fuel injection amount is greatly changed depending not only on the injection characteristic of the fuel injection valve, but also on the characteristic of the pressure boosting device. Therefore, when the pressure boosting common rail fuel injection apparatus is employed in the multi-cylinder internal combustion engine, it is necessary to reduce both the deviation of the injection characteristic of the fuel injection valve and the deviation of the characteristic of the pressure boosting device. Thus, adjustment is extremely difficult as compared to when only the deviation of the injection characteristic of the fuel injection valve needs to be reduced.

Also, even if the deviation of the initial characteristic of the fuel injection valve and the deviation of the initial characteristic of the pressure boosting device in each cylinder can be minimized to a specified value, the characteristic of the fuel injection valve and the characteristic of the pressure boosting device vary with use due to wear or deterioration. Therefore, even if the deviation of the initial characteristic is in a specified range, the fuel injection amount in each cylinder may be deviated due to changes in the characteristics caused with use.

In order to prevent this situation, it is necessary to adjust each fuel injection valve and each pressure boosting device so that the deviation of the fuel injection amount in each cylinder is reduced while the fuel injection apparatus is operated. In the pressure boosting fuel injection apparatus, the fuel injection amount in each cylinder is decided depending on both of the characteristic of the fuel injection valve and the characteristic of the pressure boosting device. Therefore, if the fuel injection amount in one cylinder is greatly deviated from the fuel injection amount in another cylinder, it is difficult to determine whether the deviation is caused by the fuel injection valve or by the pressure boosting device, based only on the fuel injection amount. As a result, in the pressure boosting fuel injection apparatus, the deviation of the fuel injection in each cylinder cannot be reduced, and properties of exhaust gas is likely to deteriorate, and vibration or noise is likely to occur when a vehicle is driven.

SUMMARY OF THE INVENTION

It is an object of the invention to provide a fuel injection amount correction method for a pressure boosting fuel injection apparatus, which makes it possible to easily correct the deviations of initial characteristics of a fuel injection valve and a pressure boosting device in each cylinder, and the deviations of characteristics due to changes in the characteristics with use while an engine is operated, thereby reducing the deviation of a fuel injection amount in each cylinder.

A first aspect of the invention relates to a fuel injection amount correction method of correcting a fuel injection amount in a pressure boosting fuel injection apparatus including a common rail that stores fuel having a predetermined pressure and supplies the fuel to a fuel injection valve; pressure boosting means for increasing the pressure of the fuel to be supplied to the fuel injection valve from the common rail to a boosted pressure that is higher than the predetermined pressure; and injection control means for opening the fuel injection valve and causing the fuel injection valve to inject the supplied fuel, the pressure boosting fuel injection apparatus controlling a fuel injection characteristic of the fuel injection valve by adjusting a difference between operation starting timing of the pressure boosting means and operation starting timing of the injection control means when the pressure boosting means is in an operated state. The fuel injection amount correction method includes the steps of causing the injection control means to be operated so as to perform fuel injection when the pressure boosting means is in a non-operated state; and correcting the fuel injection amount of the fuel injection valve when the fuel injection is performed.

That is, in the pressure boosting fuel injection apparatus to which the fuel injection amount correction method in the first aspect is applied, the fuel injection characteristic is controlled by adjusting the operation starting timing of the pressure boosting means and the operation starting timing of the injection control means when the pressure boosting means is in the operated state. Therefore, the actual fuel injection amount is influenced by a complicated combination of the deviations of both of the pressure boosting means and the injection control means, and the aforementioned operation starting time difference. Therefore, it is difficult to detect and correct the deviation of the fuel injection amount caused by the deviation of the characteristic of each element.

According to the invention, the fuel injection amount is corrected when the pressure boosting means is in the non-operated state. When the pressure boosting means is in the non-operated state, the fuel injection amount is not influenced by the deviation of the pressure boosting characteristic of the pressure boosting means. Therefore, the deviation of the fuel injection amount in this state is caused only by the deviation of the characteristic of the fuel injection valve. Thus, it is possible to correct the deviation of the fuel injection amount caused by the deviation of the characteristic of the fuel injection valve independently of the deviation of the fuel injection amount caused by the deviation of the characteristic of the pressure boosting means. Accordingly, the deviation of the fuel injection amount can be corrected while an engine is operated without strictly adjusting the initial characteristic of the fuel injection valve to a reference value.

In the fuel injection amount correction method according to the invention, the deviation of the characteristic of the fuel injection valve from the reference value can be corrected while the engine is operated. Therefore, after the fuel injection amount correction according to the invention is performed, the deviation of the fuel injection amount at the time when the pressure boosting means is in the operated state is caused only by the deviation of the characteristic of the pressure boosting means. Thus, it is also possible to correct the deviation of the characteristic of the pressure boosting means.

In the first aspect of the invention, the fuel injection amount correction method may further include the step of correcting the operation starting timing of the pressure boosting means after the fuel injection amount of the fuel injection valve is corrected when the fuel injection is performed. First, the deviation of the fuel injection amount caused by the deviation of the characteristic of the fuel injection valve is corrected, and then the deviation of the fuel injection amount caused by the deviation of the characteristic of the pressure boosting means is corrected. After the deviation of the fuel injection amount caused by the deviation of the characteristic of the fuel injection valve is corrected, the deviation of the fuel injection amount is caused only by the deviation of the characteristic of the pressure boosting means. Thus, according to the invention, it is possible to detect and correct the deviation of the fuel injection amount caused only by the deviation of the injection characteristic of the fuel injection valve, and the deviation of the fuel injection amount caused only by the deviation of the characteristic of the pressure boosting means, independently of each other. Thus, it is possible to accurately correct the fuel injection amount.

In the first aspect of the invention, the pressure boosting fuel injection apparatus may include a plurality of the fuel injection valves and a plurality of the injection control means; and an operating period of each of the injection control means may be adjusted such that a deviation of the fuel injection amount of each of the fuel injection valves is reduced when the fuel injection amount is corrected.

A second aspect of the invention relates to a fuel injection amount correction method of correcting a fuel injection amount in a pressure boosting fuel injection apparatus including a common rail that stores fuel having a predetermined pressure and supplies the fuel to a fuel injection valve; pressure boosting means for increasing the pressure of the fuel to be supplied to the fuel injection valve from the common rail to a boosted pressure that is higher than the predetermined pressure; and injection control means for opening the fuel injection valve and causing the fuel injection valve to inject the supplied fuel, the pressure boosting fuel injection apparatus controlling a fuel injection characteristic of the fuel injection valve by adjusting a difference between operation starting timing of the pressure boosting means and operation starting timing of the injection control means when the pressure boosting means is in an operated state. The fuel injection amount correction method includes the steps of causing the injection control means to be operated so as to perform fuel injection after the pressure of the fuel to be supplied to the fuel injection valve reaches the boosted pressure after the pressure boosting means starts to be operated; and correcting the fuel injection amount of the fuel injection valve when the fuel injection is performed.

That is, in the fuel injection amount correction method according to the second aspect of the invention, the fuel injection is performed after the pressure of the fuel to be supplied to the fuel injection valve reaches the boosted pressure after the pressure boosting means starts to be operated, and the fuel injection amount of the fuel injection valve is corrected when the fuel injection is performed. In a case where the pressure boosting means is in the operated state, when the pressure boosting means starts to be operated, the pressure of the fuel to be supplied to the fuel injection valve starts to be increased, and reaches the predetermined boosted pressure. Accordingly, since the fuel injection is performed after the pressure of the fuel to be supplied to the fuel injection valve reaches the boosted pressure, the fuel injection can be performed with the pressure of the fuel to be supplied to the fuel injection valve being maintained at the high constant value.

Therefore, since the fuel injection amount of the fuel injection valve is corrected in this state, it is possible to detect and correct the deviation of the fuel injection amount caused only by the deviation of the fuel injection characteristic of the fuel injection valve under the high pressure, while removing influence of the pressure boosting characteristic of the pressure boosting means (for example, a speed at which the pressure of the supplied fuel is increased).

Also, since the deviation of the fuel injection amount caused only by the deviation of the fuel injection characteristic of the fuel injection valve is corrected in this manner, it is possible to detect and correct the deviation of the fuel injection amount caused only by the pressure boosting characteristic of the pressure boosting means thereafter.

In an aspect relating to the second aspect of the invention, the fuel injection amount correction method may further include the step of correcting the operation starting timing of the pressure boosting means after the fuel injection amount of the fuel injection valve is corrected when the fuel injection is performed. First, the deviation of the fuel injection amount caused by the deviation of the characteristic of the fuel injection valve is corrected, and then the deviation of the fuel injection amount caused by the deviation of the characteristic of the pressure boosting means is corrected. After the deviation of the fuel injection amount caused by the deviation of the characteristic of the fuel injection valve is corrected, the deviation of the fuel injection amount is caused only by the deviation of the characteristic of the pressure boosting means. Thus, according to the invention, it is possible to detect and correct the deviation of the fuel injection amount caused only by the deviation of the injection characteristic of the fuel injection valve, and the deviation of the fuel injection amount caused only by the deviation of the characteristic of the pressure boosting means, independently of each other. Thus, it is possible to accurately correct the fuel injection amount.

In the second aspect of the invention, the pressure boosting fuel injection apparatus may include a plurality of the fuel injection valves and a plurality of the injection control means; and an operating period of each of the injection control means may be adjusted such that a deviation of the fuel injection amount of each of the fuel injection valves is reduced when the fuel injection amount is corrected. Thus, when the deviation of the fuel injection characteristic of each of the fuel injection valves is corrected, the valve opening period of each of the fuel injection valves is adjusted such that the fuel injection amount of each of the fuel injection valves becomes uniform. Accordingly, the deviation of the fuel injection amount caused by the deviation of the fuel injection characteristic of each of the fuel injection valves is corrected, and the fuel injection amount of each of the fuel injection valves becomes uniform.

In an aspect relating to the second aspect of the invention, in a case where an adjustment amount by which the operating period of at least one of the injection control means is adjusted is greater than a predetermined value when the fuel injection amount is corrected, it may be determined that an abnormality has occurred in the fuel injection valve corresponding to the injection control means. Thus, in the case where the adjustment amount by which the operating period of the injection control means is adjusted is excessively large, it is determined that the deviation of the injection characteristic of the fuel injection valve is abnormally large, and it is determined that an abnormality has occurred in the fuel injection valve. Accordingly, it is possible to easily and accurately determine whether an abnormality has occurred in the fuel injection valve.

A third aspect of the invention relates to a fuel injection amount correction method of correcting a fuel injection amount in a pressure boosting fuel injection apparatus including a common rail that stores fuel having a predetermined pressure and supplies the fuel to a fuel injection valve; pressure boosting means for increasing the pressure of the fuel to be supplied to the fuel injection valve from the common rail to a boosted pressure that is higher than the predetermined pressure; and injection control means for opening the fuel injection valve and causing the fuel injection valve to inject the supplied fuel, the pressure boosting fuel injection apparatus controlling a fuel injection characteristic of the fuel injection valve by adjusting a difference between operation starting timing of the pressure boosting means and operation starting timing of the injection control means when the pressure boosting means is in an operated state. The fuel injection amount correction method includes the steps of causing the injection control means to be operated so as to perform fuel injection before the pressure of the fuel to be supplied to the fuel injection valve reaches the boosted pressure when the pressure boosting means is in the operated state; and correcting the operation starting timing of the pressure boosting means when the fuel injection is performed.

That is, in the third aspect of the invention, since the fuel injection is started before the pressure of the fuel to be supplied to the fuel injection valve reaches the boosted pressure when the pressure boosting means is in the operated state. Therefore, the fuel injection period is set so as to include a period during which the pressure of the fuel to be supplied to the fuel injection valve is being increased by the pressure boosting means. Accordingly, the fuel injection amount of the fuel injection valve is greatly influenced by a speed at which the pressure of the fuel to be supplied to the fuel injection valve is being boosted by the pressure boosting means. Thus, since the fuel injection is performed while the pressure of the fuel to be supplied to the fuel injection valve is being boosted, it is possible to detect the deviation of the pressure boosting characteristic of the pressure boosting means (the speed at which the pressure is being boosted) from a reference value, based on the fuel injection amount at this time. Accordingly, it is possible to correct the deviation of the fuel injection amount caused by the deviation of the pressure boosting characteristic of the pressure boosting means.

The deviation of the characteristic of the pressure boosting means is corrected by changing the operation starting timing of the pressure boosting means, that is, a degree to which the pressure of the fuel to be supplied to the fuel injection valve has been increased when the fuel injection is started. Thus, it is possible to correct the deviation of the fuel injection amount caused by the deviation of the pressure boosting characteristic of the pressure boosting means.

In the third aspect of the invention, the pressure boosting fuel injection apparatus may include a plurality of the fuel injection valves, a plurality of the injection control means, and a plurality of the pressure boosting means; and the difference between the operation starting timing of the pressure boosting means and the operation starting timing of the injection control means may be adjusted for each of the fuel injection valves such that a deviation of the fuel injection amount of each of the fuel injection valves is reduced when the fuel injection amount is corrected. Thus, when adjusting the operation starting timing of the pressure boosting means, the difference between the operation starting timing of the pressure boosting means and the operation starting timing of the injection control means is corrected such that the deviation of the fuel injection amount of each of the fuel injection valves is reduced. Accordingly, it is possible to correct the deviation of the fuel injection amount of each of the fuel injection valves caused by the deviation of the characteristic of the pressure boosting means. As a result, the fuel injection amount of each of the fuel injection valves becomes uniform.

In an aspect relating to the third aspect of the invention, in a case where an adjustment amount by which the difference between the operation starting timing of the pressure boosting means and the operation starting timing of the injection control means is adjusted is greater than a predetermined value when the fuel injection amount is corrected, it may be determined that an abnormality has occurred in the pressure boosting means. Thus, in the case where the adjustment amount by which the difference between the operation starting timing of the pressure boosting means and the operation starting timing of the injection control means is excessively large when the fuel injection amount is corrected, it is determined that the deviation of the pressure boosting characteristic of the pressure boosting means is abnormally large, and it is determined that an abnormality has occurred in the pressure boosting means. Thus, it is possible to easily and accurately determine whether an abnormality has occurred in the pressure boosting means.

In the third aspect of the invention or the aspect relating to the third aspect of the invention, the pressure boosting fuel injection apparatus may further include pressure boosting control means for changing between fuel injection with the pressure boosting means being in the operated state, and fuel injection with the pressure boosting means being in the non-operated state, according to an engine operating state; and the fuel injection amount may be corrected by operating the pressure boosting means for a time period required for correcting the fuel injection amount when the pressure boosting means should be maintained in the non-operated state by the pressure boosting control means according to the engine operating state. Thus, the characteristic of the pressure boosting means is corrected by operating the pressure boosting means for the time period required for correcting the fuel injection amount at the time of low pressure injection when injection should be performed using only the pressure in the common rail without operating the pressure boosting means. Accordingly, it is possible to correct the pressure boosting means even when the pressure boosting means should be maintained in the non-operated state according to the engine operating state, for example, at the time of low pressure injection.

According to the invention, since the pressure boosting means is operated when the low pressure injection should be performed, the fuel injection pressure of the fuel injection valve is actually increased. However, it is possible to prevent influence of the increase in the fuel injection pressure on the engine operation by decreasing the pressure in the common rail in advance, and suppressing a large increase in the fuel injection pressure when the pressure is boosted.

A fourth aspect of the invention relates to a fuel injection amount correction method for a pressure boosting fuel injection apparatus including a common rail that stores fuel having a predetermined pressure and supplies the fuel to a fuel injection valve; pressure boosting means including a piston with a large diameter to which the pressure of the fuel in the common rail is applied, and a pressurizing piston with a small diameter which is connected to the piston with the large diameter, and which pressurizes the fuel to be supplied to the fuel injection valve from the common rail, the pressure boosting means increasing the pressure of the fuel to be supplied to the fuel injection valve from the predetermined pressure in the common rail to a boosted pressure that is higher than the predetermined pressure, using the pressurizing piston; and injection control means for opening the fuel injection valve and causing the fuel injection valve to inject the supplied fuel, the pressure boosting fuel injection apparatus controlling a fuel injection characteristic of the fuel injection valve by adjusting a difference between operation starting timing of the pressure boosting means and operation starting timing of the injection control means when the pressure boosting means is in an operated state. The fuel injection amount correction method includes the steps of calculating the fuel injection amount of the fuel injection valve based on a change in the pressure of the fuel in the common rail when fuel injection is performed with the pressure of the fuel being boosted by the pressure boosting means; and correcting the fuel injection amount of the fuel injection valve based on the calculated fuel injection amount.

According to the fourth aspect of the invention, in the fuel injection apparatus to which the fuel injection amount correction method is applied, the pressure boosting means supplies the hydraulic pressure in the common rail to the piston with the large diameter, presses the pressurizing piston with the small diameter connected to the piston with the large diameter, thereby pressurizing the fuel supplied from the common rail, and delivering the fuel under pressure to the fuel injection valve. Therefore, when the boosted pressure fuel injection is performed, the amount of fuel flowing into the piston with the large diameter side from the common rail is equal to the amount obtained by multiplying the amount of fuel (i.e., the fuel injection amount) delivered under pressure to the fuel injection valve by the pressurizing piston with the small diameter, by an area ratio between the piston with the large diameter and the piston with the small diameter.

When the pressure boosting means is in the non-operated state, the common rail discharges the fuel of the amount equivalent to the fuel injection amount each time the fuel injection is performed, and the pressure in the common rail is decreased in proportion to the fuel injection amount. However, since ordinarily, the volume of the common rail is set so as to be sufficiently large compared to the fuel injection amount, a change in the pressure in the common rail is small when the fuel injection is performed with the pressure boosting means being in the non-operated state. Meanwhile, when the pressure boosting means is in the operated state, the common rail discharges a relatively large amount of the fuel required for pushing the piston with the large diameter of the pressure boosting means, in addition to the fuel injection amount of the fuel injection valve. Therefore, when the fuel injection is performed with the pressure boosting means being in the operated stated, the degree of the reduction in the pressure in the common rail is relatively large. Also, in this case as well, the degree of the reduction in the common rail is proportional to the fuel injection amount. Accordingly, when the fuel injection is performed with the pressure boosting means being in the operated state, since the degree of the reduction in the pressure in the common rail is large, and the degree of the reduction in the pressure in the common rail can be accurately measured, the fuel injection amount of the fuel injection valve can be accurately calculated based on the reduction in the pressure in the common rail when the fuel injection is performed.

According to the invention, by calculating the fuel injection amount of the fuel injection valve based on the change in the pressure in the common rail when the boosted pressure fuel injection is performed, it is possible to easily and accurately determine the fuel injection amount. Thus, the fuel injection amount can be accurately corrected.

According to the aforementioned aspects of the invention, the fuel injection amount in the pressure boosting fuel injection apparatus can be easily and accurately corrected while the engine is operated. Therefore, it is possible to reduce man hours required for strictly adjusting the injection characteristic of the fuel injection valve and the operation characteristic of the pressure boosting means and to reduce the cost. In addition, it is possible to correct the deviation of the fuel injection amount caused by the change in the characteristics of the fuel injection valve and the pressure boosting means after the fuel injection valve and the pressure boosting means start to be used.

DETAILED DESCRIPTION OF THE PREFERRED EMBODIMENTS

Figure 1:
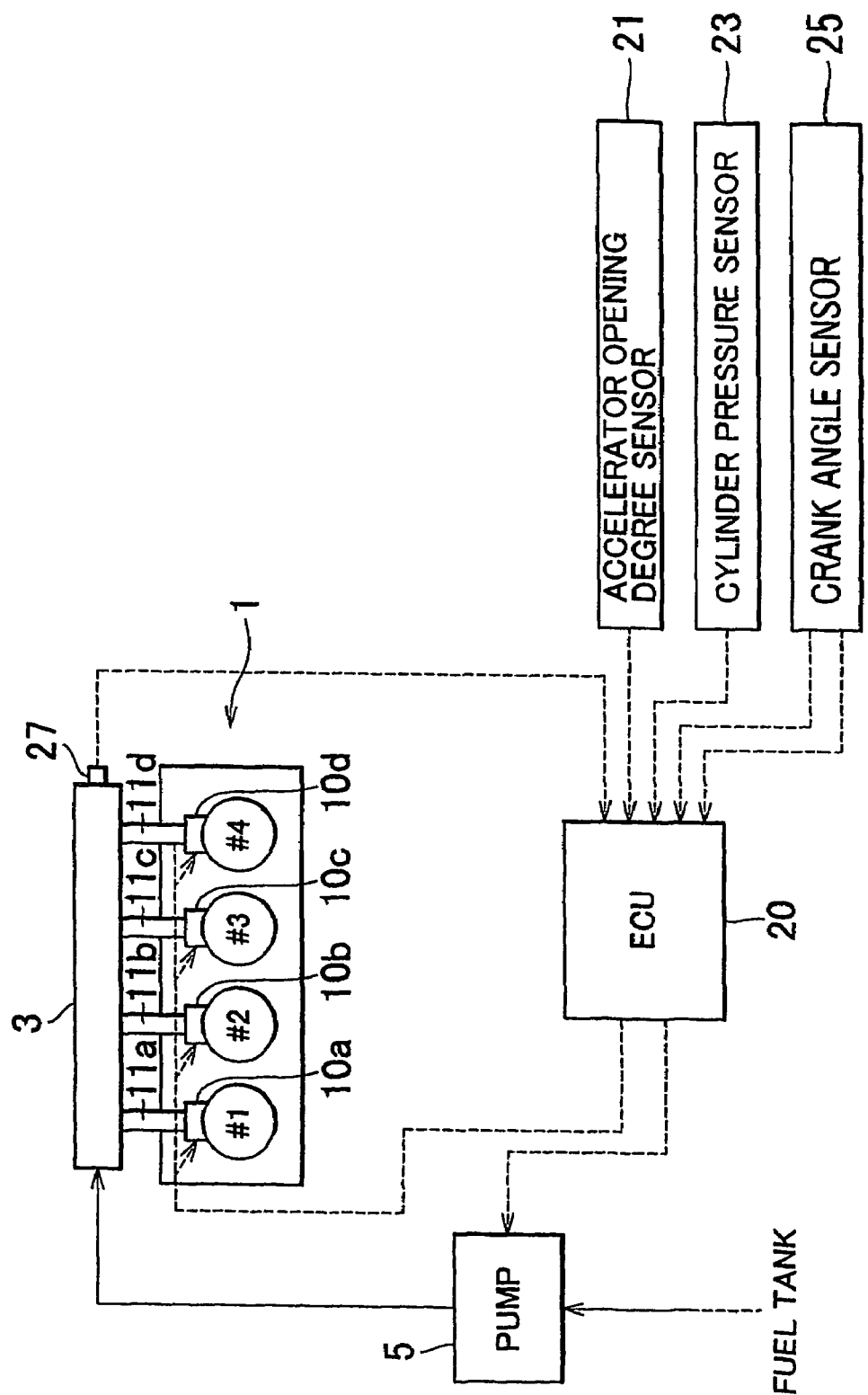
FIG. 1 is a schematic diagram showing a configuration of a diesel engine for an automobile to which a fuel injection amount correction method according to the invention can be applied.

Hereinafter, an embodiment of the invention will be described with reference to the accompanying drawings. FIG. 1 is a schematic diagram showing a configuration when a fuel injection apparatus which is operated using a fuel injection amount correction method according to the invention is used in a diesel engine for an automobile.

In FIG. 1, an internal combustion engine 1 includes fuel injection valves 10a to 10d each of which includes a pressure boosting unit and injects fuel directly into each of cylinders #1 to #4. In this embodiment, a four-cylinder four-cycle diesel engine including four cylinders #1 to #4 is used as the internal combustion engine 1. The fuel injection valves 10a to 10d are connected to a common accumulator (common rail) 3 through high pressure fuel pipes 11a to 11d, respectively. The common rail 3 stores pressurized fuel supplied by a high pressure fuel injection pump 5, and distributes the high pressure fuel to the fuel injection valves 10a to 10d through the high pressure fuel pipes 11a to 11d, respectively.

In the embodiment of the invention, for example, the high pressure fuel injection pump 5 is a plunger type pump including a flow rate adjusting mechanism. The high pressure fuel injection pump 5 increases a pressure of fuel supplied from a fuel tank (not shown) to a predetermined pressure, and then supplies the fuel to the common rail 3. The amount of fuel delivered to the common rail 3 from the pump 5 under pressure is controlled by an Electronic control unit (hereinafter, referred to as "ECU") 20 through feedback so that the pressure of the common rail 3 becomes equal to a target pressure.

In FIG. 1, the ECU 20 controls the internal combustion engine 1. The ECU 20 is configured as a digital computer having a known configuration in which a read only memory (ROM), a random access memory (RAM), a microprocessor (CPU), and input/output ports are connected to each other using a bi-directional bus. The ECU 20 controls valve opening timing and a valve opening period of each of the fuel injection valves 10a to 10d, operation starting timing of each of pressure boosting units 110a to 110d (described later), and the like, thereby controlling fuel injection timing and a fuel injection amount of each of the fuel injection valves 10a to 10d. In addition, the ECU 20 performs basic controls of the engine such as a control of an engine rotational speed.

In order to perform these controls, in this embodiment, a fuel pressure sensor 27 for detecting the fuel pressure in the common rail 3 is provided in the common rail 3. Also, an accelerator opening degree sensor 21 for detecting an accelerator opening degree (a depression amount of an accelerator pedal operated by a driver) is provided in the vicinity of the accelerator pedal (not shown) for the engine 1.

In FIG. 1, a crank angle sensor 25 detects a rotational phase of a crankshaft of the engine 1. The crank angle sensor is provided in the vicinity of the crank shaft. The crank angle sensor 25 generates a crank angle pulse signal every predetermined crank angle (e.g., every 15 degrees), and outputs a reference pulse signal every 720 degrees of the crank angle. The ECU 20 calculates the engine rotational speed based on frequency of the crank angle pulse signal input thereto from the crank angle sensor 25. Also, the ECU 20 calculates the fuel injection timing and the fuel injection amount of each of the fuel injection valves 10a to 10d based on an accelerator opening degree signal input thereto from the accelerator opening degree sensor 21, and the engine rotational speed. In this embodiment, as a method for calculating the fuel injection timing and the fuel injection amount of the fuel injection valve, any known method can be used. Also, the ECU 20 calculates the rotational phase of the crank shaft present crank angle) based on the number of the crank angle pulse signals after the reference pulse signal of the crank angle sensor 25 is input thereto.

Further, in this embodiment, each of cylinder pressure sensors 23a to 23d (hereinafter, collectively referred to as "cylinder pressure sensor 23") for detecting the pressure in the cylinder is provided in each cylinder of the engine 1. The output of the cylinder pressure sensor 23 is also input to the input port of the ECU 20 through an analogue to digital converter (not shown). As described later, the ECU 20 uses the cylinder pressure in each cylinder detected by the cylinder pressure sensor 23 while the engine is operated and the crank angle detected by the crank angle sensor 25 for calculating the actual fuel injection amount in each cylinder.

Next, description will be made of the configuration of the fuel injection valve 10 with the pressure boosting unit (since the fuel injection valves 10a to 10d have the same configuration, hereinafter, collectively referred to as "fuel injection valve 10") in this embodiment of the invention.

Figure 2:
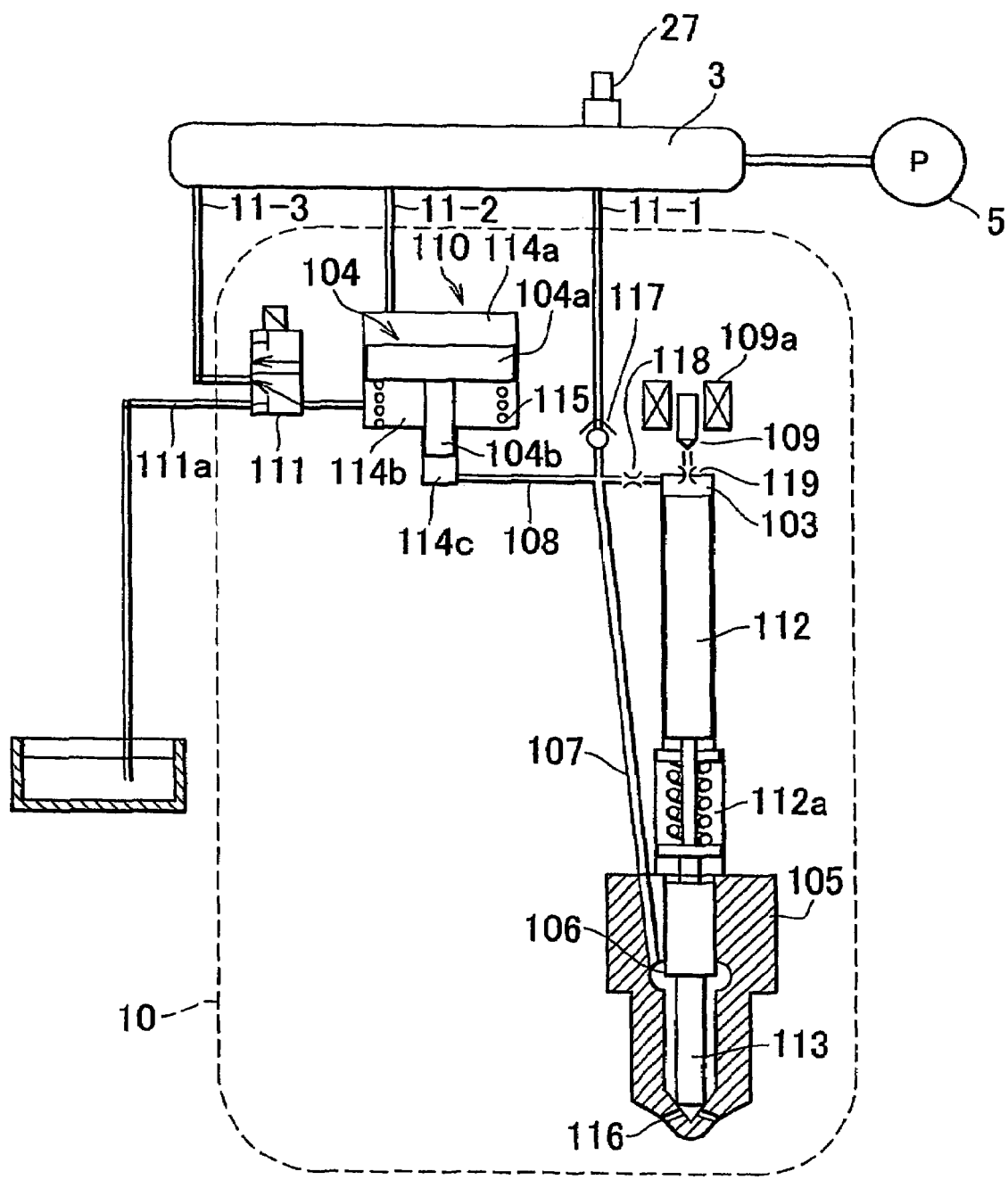
FIG. 2 is a schematic diagram showing an example of a configuration of a fuel injection valve with a fuel boosting unit.

FIG. 2 is a schematic diagram showing the configuration of the fuel injection valve 10 with the pressure boosting unit in this embodiment of the invention.

FIG. 2 shows the entire fuel injection valve 10 with the pressure boosting unit. As shown in FIG. 1, the fuel injection valve 10 is connected to the common rail 3 through the high pressure pipe 11. In FIG. 2, the three high pressure pipes 11-1, 11-2, 11-3 are shown for the sake of convenience. However, the three pipes may extend from one high pressure pipe 11.

In FIG. 2, a pressure boosting unit 110, and a pressure boosting control valve 111 are provided. A needle 113 opens/closes a nozzle hole 116 of a nozzle portion 104 of the fuel injection valve 10. A fuel pit 106 is formed around the needle 113 in the nozzle portion 105. A command piston 112 in FIG. 2 receives a hydraulic pressure in a injection control chamber 103 described later and presses the needle 113 downward (i.e., in a valve closing direction) in FIG. 2. A spring 112a presses the needle 113 in the valve closing direction, independently of the command piston 112.

The injection control chamber 103 is formed in an upper portion of the needle 113. In the control chamber 103, an injection control valve 109 including a solenoid actuator 109a is provided. By operating the solenoid actuator 109a, the hydraulic pressure in the control chamber 103 is discharged to a drain pipe (not shown) through an orifice 119. Also, the control chamber 103 is connected to a pressure boosting fuel passage 108 through an orifice 118, and is connected to the high pressure pipe 11-1 through a non-return valve 117.

In FIG. 2, a fuel injection passage 107 is provided. The fuel injection passage 107 is connected to the fuel pit 106 of the nozzle 105. When boosted pressure fuel injection is performed, the fuel whose pressure is boosted by the pressure boosting unit 110 is supplied to the fuel pit 106 through the fuel injection passage 107. When non-boosted pressure fuel injection is performed, the fuel is supplied to the fuel pit 106 from the common rail 3 through the fuel injection passage 107.

When the injection control valve 119 is in a closed state, the fuel pressure in the injection control chamber 103 is substantially equal to the pressure in the fuel injection passage 107 and the pressure in the fuel pit 106. In this state, the needle 113 is pressed by the spring 112a and the command piston 112, and the needle 113 is in close contact with a seat at a tip of the nozzle so as to close the nozzle hole 116. Meanwhile, when electric current is supplied to the actuator 109a, and the injection control valve 109 is opened, the fuel in the control chamber 103 is discharged to the drain pipe through the orifice 119, and the pressure in the control chamber 103 is decreased.

As a result, the pressure in the control chamber 103 becomes lower than the pressure in the fuel injection passage 107 and the pressure in the fuel pit 106. Therefore, the needle 113 is pressed by the hydraulic pressure in the fuel pit 106, and is moved upward (i.e., in a valve opening direction) against the pressing force of the spring 112a and the command piston 112. Thus, the nozzle hole 116 is opened, and the fuel in the fuel pit 106 is injected from the nozzle hole 116.

Next, the pressure boosting unit 110 will be described. The pressure boosting unit 110 includes a pressure boosting piston 104. The pressure boosting piston 104 includes a large-diameter piston portion 104a and a small-diameter piston portion 104b. A pressure boosting control chamber 114b is formed on the small-diameter piston portion 104b side of the large-diameter piston portion 104a. A hydraulic pressure chamber 114a is formed on a side of the large-diameter piston portion 104b, the side being opposite to the pressure boosting control chamber 114b. Communication is provided between the hydraulic pressure chamber 114a and the common rail 3 through the high pressure pipe 11-2. Further, a pressure boosting chamber 114c is formed so as to be adjacent to an end portion of the small-diameter piston portion 104b of the pressure boosting piston 104. Communication is provided between the pressure boosting chamber 114c and the pressure boosting fuel passage 108.

In FIG. 2, a pressure boosting control valve 111 is provided. The pressure boosting control valve 111 is a solenoid-driven selector valve. The pressure boosting control valve 111 selectively connects the pressure boosting control chamber 114b to the common rail 3 or the drain pipe 11a through the high pressure pipe 11-3. When the pressure boosting unit 110 is in a non-operated state, supply of electric current to a solenoid actuator for the pressure boosting control valve 111 is stopped, and the pressure boosting control chamber 114b is connected to the high pressure pipe 11-3 through the pressure boosting control valve 111. Therefore, the fuel pressure in the common rail 3 is applied to the pressure boosting control chamber 114b. Also, the pressure in the common rail 3 is applied to the hydraulic pressure chamber 114a of the pressure boosting unit 110 through the high pressure pipe 11-2. Therefore, the pressures on the both sides of the large-diameter piston portion 104a of the pressure boosting piston 104 become the same.

In this state, the pressure boosting piston 104 is pushed and moved upward by the spring 115 which urges the large-diameter piston portion 104a toward the hydraulic pressure chamber 114a side. The fuel flows into the pressure boosting chamber 114c from the common rail 3 through the pipe 11-1 and the non-return valve 117. Therefore, the fuel pressure in the pressure boosting fuel passage 108 and the fuel injection passage 107 becomes equal to the pressure in the common rail 3. That is, when the pressure boosting unit 110 is in the non-operated state, the injection pressure of the fuel injection valve 10 becomes equal to the fuel pressure in the common rail 3.

Meanwhile, when electric current is supplied to the solenoid actuator for the pressure boosting control valve 111, the pressure boosting control chamber 114b is connected to the drain pipe 111a through the pressure boosting control valve 111. Thus, the fuel in the pressure boosting control chamber 114b is discharged to the drain 111a through the pressure boosting control valve 111. As a result, the pressure in the pressure boosting control chamber 114b is sharply decreased.

Accordingly, the pressure boosting piston 104 is pressed by the hydraulic pressure in the hydraulic pressure chamber 114a which is applied to the large-diameter piston portion 104a, and the fuel in the pressure boosting chamber 114c is pressurized by the small-diameter piston portion 104b. Thus, the fuel pressure in the pressure boosting chamber 114c becomes substantially equal to a value obtained by multiplying the common rail fuel pressure in the hydraulic pressure chamber 114a by a cross-sectional area ratio between the large-diameter piston portion 104a and the small-diameter piston portion 104b. That is, when the pressure boosting unit 110 is in the operated state, the pressure in the pressure boosting fuel passage 108 and the fuel injection passage 107, and the pressure in the injection control chamber 103 are increased to the boosted pressure obtained by multiplying the fuel pressure in the common rail 3 by the cross-sectional area ratio between the large-diameter piston portion 104a and the small-diameter piston portion 104b.

Thus, in the fuel injection valve 10 with the pressure boosting unit according to this embodiment, the fuel injection pressure can be boosted from the low pressure (fuel pressure in the common rail 3) to the high pressure (boosted pressure) by changing the state of the pressure boosting unit 110 from the non-operated state to the operated state. In this case, when the pressure is boosted, the boosted pressure is applied only to the pressure boosting chamber 114c of the pressure boosting unit 110, the pressure boosting fuel passage 108, the fuel injection passage 107, the nozzle portion 105, the injection control chamber 103, and the like. Accordingly, since the pressure boosting unit 110 is used, the designed pressure of almost all of the elements of the fuel injection apparatus such as the common rail 3 and the fuel pump 5 can be set to a relatively low value that is substantially equal to the designed pressure in the conventional apparatus. Therefore, it is possible to boost the fuel injection pressure to a large extent while suppressing an increase in the cost of the entire fuel injection apparatus.

However, in the case where the fuel injection valve with the pressure boosting unit is installed in each cylinder in the multi-cylinder internal combustion engine as shown in FIG. 1, the fuel injection amount in each cylinder is deviated. That is, the fuel injection characteristic of each fuel injection valve is deviated, and the characteristic of each pressure boosting unit is deviated due to the deviation of the initial characteristic caused by a manufacturing tolerance, the deviation of the characteristic caused by wear with use, or the like.

As a result, in the case of the multi-cylinder internal combustion engine, the fuel injection amount in each cylinder is deviated. If the deviation of the fuel injection amount in each cylinder is large, the output torque of the engine may fluctuate to a large extent, large vibration may occur, and properties of exhaust gas may deteriorate. Therefore, as described above, it is necessary to correct the initial deviation of the characteristic of each element, the deviation caused with use, or the like. That is, it is necessary to adjust each fuel injection valve such that the fuel injection amount in each cylinder is made uniform.

As described later, a method of detecting or estimating the fuel injection amount in each cylinder while the engine is operated has been conventionally known. However, in the case of the fuel injection valve with the pressure boosting unit as shown in FIG. 2, the fuel injection characteristic is influenced by both of the fuel injection characteristic of the nozzle 105, the needle 113, the injection control valve 109, and the like (hereinafter, collectively referred to as "fuel injection valve element"), and the pressure boosting characteristic of the pressure boosting unit 110, the pressure boosting control valve 111, and the like (hereinafter, collectively referred to as "pressure boosting element").

Accordingly, if the fuel injection amount in each cylinder is estimated while the engine is operated, and it is determined that the fuel injection amount in each cylinder is deviated, it is difficult to determine whether the deviation of the fuel injection amount in each cylinder is caused by the deviation of the characteristic of the fuel injection valve element or the deviation of the characteristic of the fuel increasing element. Therefore, in the conventional case, when correcting the characteristic of each element while the engine is operated, it is not possible to decide the element whose characteristic needs to be corrected, and the extent to which the characteristic needs to be corrected. As a result, it is difficult to make the fuel injection amount in each cylinder uniform.

In this embodiment of the invention, in order to solve the aforementioned problem, the following three corrections are performed. (1) Correction of the injection characteristic of the fuel injection valve element at the time of low pressure injection. (2) Correction of the injection characteristic of the fuel injection valve element at the time of boosted pressure rectangular injection. (3) Correction of the pressure boosting characteristic of the pressure boosting unit at the time of boosted pressure delta injection. Hereinafter, each correction will be described.

(1) Correction of the injection characteristic of the fuel injection valve element at the time of low pressure injection. In this specification, the fuel injection while the pressure boosting unit 110 is in the non-operated state is referred to as "low pressure injection". That is, the term "low pressure injection" signifies the same fuel injection as ordinary common rail fuel injection.

In this embodiment, while the low pressure injection is performed in the engine, the fuel injection amount in each cylinder is detected or estimated. The pressure boosting unit is in the non-operated state while the low pressure injection is performed. Therefore, if the fuel injection amount in each cylinder is deviated, the deviation is caused only by the deviation of the characteristic of the fuel injection valve element.

Accordingly, in this embodiment, first, the fuel injection amount in each cylinder is detected or estimated when the low pressure injection is performed. If the fuel injection amount in each cylinder is deviated, the fuel injection characteristic of each fuel injection valve is corrected so as to reduce the deviation of the fuel injection amount in each cylinder.

More specifically, the fuel injection characteristic is corrected by correcting a fuel injection period (a valve opening period of the fuel injection valve). The fuel injection amount of each fuel injection valve is changed depending on a nozzle hole diameter, the fuel injection pressure, and the fuel injection period (valve opening period). Ordinarily, since the nozzle hole diameter is decided by the fuel injection valve, a standard fuel injection amount of each fuel injection valve is decided based on a reference numerical table in which the fuel injection period corresponds to the fuel injection amount at each fuel injection pressure.

As described above, the injection characteristic of the fuel injection valve is actually changed due to the initial deviation caused by the manufacturing tolerance, or wear with use at various portions. In this embodiment, the change in the injection characteristic of the fuel injection valve is corrected by correcting the fuel injection period. That is, in this embodiment, the fuel injection amount in each cylinder is detected, calculated, or estimated (hereinafter, collectively referred to as "detected") at the time of low pressure injection. When the deviation of the fuel injection amount in each cylinder is greater than a predetermined value, the fuel injection period of each fuel injection valve is corrected to be increased or decreased so that the deviation becomes equal to or less than the predetermined value. As described later, the deviation is corrected using methods corresponding to a case where an absolute value of the fuel injection amount in each cylinder can be detected, a case where only a relative relationship of magnitude among the fuel injection amounts of the cylinders can be detected, or other cases.

Figure 3:
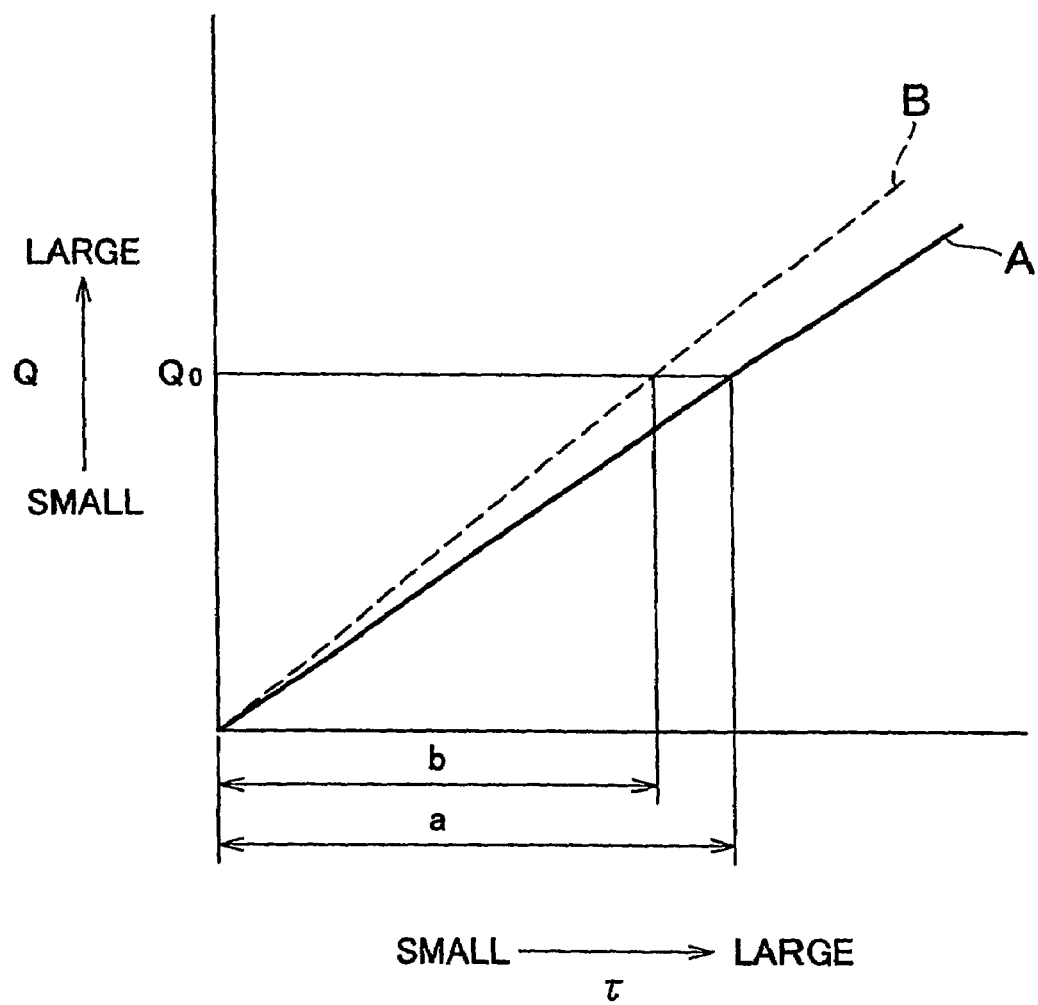
FIG. 3 is a graph explaining an injection characteristic of the fuel injection valve.

FIG. 3 shows a relationship between a fuel injection period τ and a fuel injection amount Q of the fuel injection valve (i.e., injection characteristic of the fuel injection valve). As shown in FIG. 3, the fuel injection amount Q of the fuel injection valve is increased substantially in proportion to the fuel injection period τ. In FIG. 3, a solid line A shows an injection characteristic of a reference fuel injection valve. An inclination of an injection characteristic line varies depending on the injection pressure. However, the inclination of the injection characteristic line varies with each fuel injection valve when the fuel injection amount of each fuel injection valve is deviated.

For example, the injection characteristic of a given fuel injection valve may be deviated, and the injection characteristic line indicating the injection characteristic of this fuel injection valve may be changed as shown in a dashed line B in FIG. 3. In this case, the fuel injection period of the fuel injection valve whose fuel injection amount is deviated is a period "b" though the fuel injection period (reference fuel injection period) is a period "a" according to the reference injection characteristic when injecting fuel of an amount $Q_0$. In this embodiment, a correction coefficient α of the fuel injection period is defined as α=b/a. With regard to the fuel injection valve whose fuel injection amount is deviated (indicated by the dashed line B in FIG. 3), the deviation of the fuel injection amount is corrected by multiplying the fuel injection period obtained from the reference numerical table for the fuel injection amount by the value α.

In this embodiment, since the correction coefficient α varies depending on the fuel injection pressure, the correction coefficient α is obtained both at the time of low pressure injection, and at the time of boosted pressure rectangular injection (high pressure injection) described later. When the injection pressure is intermediate, a correction coefficient is calculated, for example, by performing primary interpolation of these two correction coefficients according to the pressure.

Figure 4:
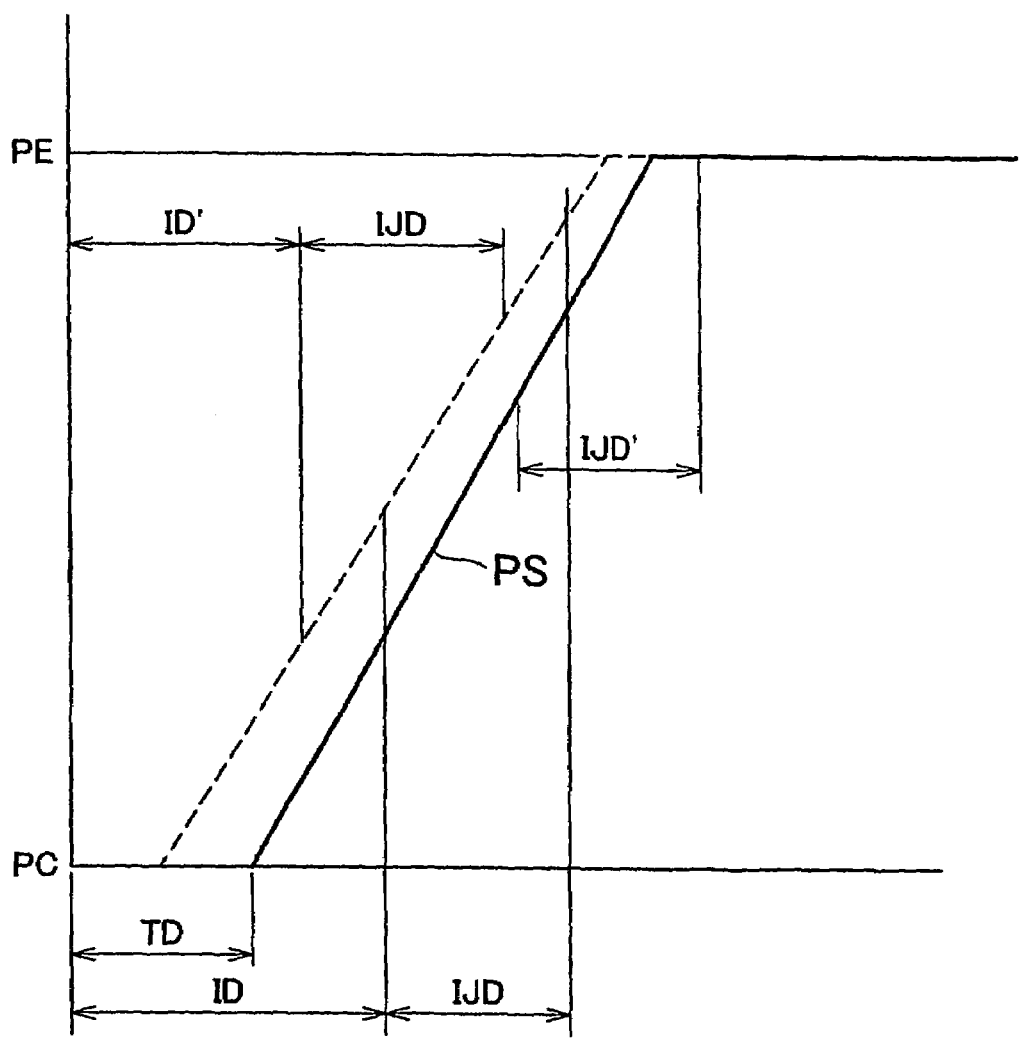
FIG. 4 is a graph explaining a pressure boosting characteristic of the pressure boosting unit.

(2) Correction of the injection characteristic of the fuel injection valve element at the time of boosted pressure rectangular injection. FIG. 4 shows the pressure boosting characteristic of the pressure boosting unit. In FIG. 4, a vertical width indicates the pressure at an outlet of the pressure boosting unit 110 (i.e., the pressure in the pressure boosting fuel passage 108), and a horizontal width indicates elapsed time since a pressure boosting command signal is transmitted to the pressure boosting control valve 111 (i.e., elapsed time after the pressure boosting control valve 111 starts to be operated).

As shown in FIG. 4, after the pressure boosting control valve 111 starts to be operated, the pressure in the pressure boosting fuel passage 108 remains equal to a common rail pressure PC and is not changed during a pressure boosting delay period TD due to delay in start of operation of the pressure boosting control valve 111 and the pressure boosting piston 104. After the pressure boosting delay period TD elapses, the pressure in the pressure boosting fuel passage 108 is increased substantially linearly. After reaching a boosted pressure PE, the pressure in the pressure boosting fuel passage 108 is maintained at the boosted pressure PE. The boosted pressure PE is the value obtained by multiplying the common rail pressure PC by the area ratio between the large-diameter piston portion 104b and the small-diameter piston portion 104a of the pressure boosting piston 104.

In a case where the initial deviation or deviation due to wear is caused in various portions of the pressure boosting element such as the pressure boosting unit 110 and the pressure boosting control valve 111, the pressure boosting delay period (operation starting delay period) TD and a speed at which the pressure is increased (an inclination of a pressure boosting slope portion PS) are changed when the pressure is boosted, as shown in a dashed line in FIG. 4. However, the boosted pressure PE which the pressure in the pressure boosting fuel passage 108 finally reaches is hardly changed. In this embodiment, fuel injection which is performed after the pressure in the outlet of the pressure boosting unit 110 reaches the boosted pressure PE when the pressure is boosted is referred to as "boosted pressure rectangular injection".

As described above, the fuel injection pressure is maintained at the boosted pressure PE throughout the fuel injection period at the time of boosted pressure rectangular injection. Further, the boosted pressure PE is hardly influenced by the deviation of each pressure boosting element such as the pressure boosting unit. Accordingly, when the fuel injection amount in each cylinder is deviated at the time of boosted pressure rectangular injection, the deviation of the fuel injection amount is caused only by the deviation of the characteristic of the fuel injection valve element, as in the case of low pressure injection.

Accordingly, in this embodiment, when the boosted pressure rectangular injection is performed in the engine, the same correction as that performed at the time of low pressure injection is performed, and a calculation is performed to obtain the correction coefficient α of the fuel injection period at the time of boosted pressure injection (i.e., at the time of high pressure injection). Thus, the correction coefficient α is calculated at the time of boosted pressure rectangular injection, in addition to the correction coefficient α calculated at the time of low pressure injection described above. That is, it is possible to obtain the two correction coefficients α of the fuel injection period when the pressure is high (i.e., at the time of boosted pressure rectangular injection), and when the pressure is low (i.e., at the time of low pressure injection). Therefore, it is possible to calculate the correction coefficient when the pressure is a given intermediate pressure.

(3) Correction of the pressure boosting characteristic of the pressure boosting unit at the time of boosted pressure delta injection. In the case of the aforementioned boosted pressure rectangular injection, the fuel injection is performed after the fuel pressure reaches the boosted pressure after the pressure boosting unit 110 starts to be operated. Therefore, in the case of the boosted pressure rectangular injection, even if the fuel injection timing is changed to some extent, the fuel injection amount is not influenced as long as the fuel pressure has reached the boosted pressure.

However, in a case where the fuel injection period is set so as to include a pressure boosting period during which the pressure boosting unit is increasing the fuel pressure (i.e., the pressure boosting slope portion PS in FIG. 4) as a period IJD in FIG. 4, when the fuel injection timing is changed (for example, the fuel injection period is changed to a period IJD' in FIG. 4), an average fuel injection pressure throughout the fuel injection period is changed. Therefore, even if the length of the fuel injection period is not changed, the fuel injection amount is changed when the fuel injection timing is changed.

In this embodiment, in the case where the fuel injection period is set so as to include the pressure boosting slope PS as the period IJD in FIG. 4, the fuel injection is referred to as "boosted pressure delta injection". In the case of the boosted pressure delta injection, both of a fuel injection rate and the fuel injection amount can be changed by changing a difference (ID in FIG. 4) between operation starting timing of the pressure boosting unit (strictly speaking, operation starting timing of the pressure boosting control valve 111) and the fuel injection starting timing, or the fuel injection period.

In this embodiment, when the boosted pressure delta injection is performed, the difference between the operation starting timing of the pressure boosting control valve 111 and the operation starting timing of the fuel injection valve 10 (hereinafter, referred to as "operation starting timing difference"), and the fuel injection period are set in advance through experiments such that optimal fuel injection can be achieved according to an engine operating state (the fuel injection amount, the engine rotational speed, and the like). Each of the operation starting timing difference and the fuel injection period is stored in the ROM of the ECU 20 as a numerical table using the fuel injection amount, the engine rotational speed, and the like as parameters.

As described above, the pressure boosting characteristic of each pressure boosting element is changed due to the initial deviation of the characteristic caused by the manufacturing tolerance, or due to wear with use. Therefore, the operation starting delay period and the inclination of the pressure boosting slope of each pressure boosting element are deviated. For example, in the case where the pressure boosting characteristic is changed from the reference characteristic (shown by a solid line in FIG. 4) as shown by the dashed line in FIG. 4, even if the operation starting timing difference ID and the fuel injection period IJD are not changed, the fuel injection amount is changed.

In this embodiment, when the fuel injection amount in each cylinder is detected at the time of boosted pressure delta injection, and the deviation of the fuel injection amount is equal to or greater than a predetermined value, the correction of the characteristic of the pressure boosting element is performed. At the time of boosted pressure delta injection, the fuel injection amount is decided depending on both of the fuel injection period and the operation starting timing difference, as described above. Therefore, when the fuel injection amount is deviated at the time of boosted pressure delta injection, there is a possibility that the deviation is caused by both of the deviation of the characteristic of the pressure boosting element and the deviation of the characteristic of the fuel injection valve element.

Accordingly, in this embodiment, first, the correction coefficient of the fuel injection period at the time of low pressure injection and the correction coefficient of the fuel injection period at the time of boosted pressure rectangular injection are obtained. After the fuel injection period is corrected based on the result, the boosted pressure delta injection is performed, and the deviation of the fuel injection amount is detected. Thus, the deviation of the fuel injection amount at the time of boosted pressure delta injection is determined after the characteristic of the fuel injection valve element is corrected. Therefore, if the fuel injection amount is deviated, the deviation of the fuel injection amount is caused only by the change in the characteristic of the pressure boosting element (i.e., the operation starting delay period ID and/or the inclination of the pressure boosting slope PS).

In this embodiment, the deviation of the fuel injection amount due to the change in the characteristic of the pressure boosting element (the operation starting delay period TD and/or the inclination of the pressure boosting slope PS) is corrected by changing the difference (ID in FIG. 4) between the operation starting timing of the pressure boosting control valve 111 and the fuel injection starting timing. More specifically, the operation starting timing difference is adjusted by changing the operation starting timing of the pressure boosting control valve 11, without changing the fuel injection starting timing and the fuel injection period.

For example, in FIG. 4, in the case where the pressure boosting characteristic is changed from the reference pressure boosting characteristic (shown by the solid line) as shown by the dashed line, when the injection is performed with the operation starting timing difference (ID) being set to a reference value, the actual injection is performed at a high pressure according to the actual pressure boosting characteristic (shown by the dashed line) as compared to the injection according to the reference pressure boosting characteristic (shown by the solid line). Therefore, the entire fuel injection amount becomes larger than a reference value.

Accordingly, in this case, for example, the fuel injection amount is decreased by decreasing the operation starting timing difference from ID to ID' as shown in FIG. 4. Also, when the fuel injection amount is smaller than the reference value, the fuel injection amount is increased by increasing the operation starting timing difference.

In this embodiment, at the time of boosted pressure delta injection, the operation starting timing difference ID' for performing adjustment such that the deviation of the fuel injection amount of each fuel injection valve becomes in a predetermined range is obtained, and the difference between the operation starting timing difference ID' and the reference operation starting timing difference ID (ID'−ID) is stored as a correction amount $\beta$ of the operation starting timing difference. At the time of boosted pressure delta injection, the characteristic of the pressure boosting element is corrected by setting the actual operation starting timing difference to a value obtained by adding the correction amount $\beta$ to the reference operation starting timing difference ID (ID+$\beta$). The reference operation starting timing difference is decided according to an engine operating condition. The operation starting timing difference can be corrected either by changing the operation starting timing of the pressure boosting control valve 111, or by changing the fuel injection starting timing. However, since changing the fuel injection starting timing may influence engine performance, the operation starting timing difference ID is changed by changing the operation starting timing of the pressure boosting control valve 111 in this embodiment.

As described above, in this embodiment, first, the characteristic of the fuel injection valve element (the fuel injection period) is corrected at the time of low pressure injection and at the time of boosted pressure rectangular injection. Next, the characteristic of the pressure boosting element (the operation starting timing difference) is corrected at the time of boosted pressure delta injection. Thus, the characteristic of the fuel injection valve element and the characteristic of the pressure boosting element are corrected independently of each other, whereby the deviation of the fuel injection amount in each cylinder can be reduced.

In this embodiment, while the engine is operated, the ECU 20 performs a control such that high pressure injection is performed using the pressure boosting unit based on the engine operating condition (the fuel injection amount, the engine rotational speed, and the like) only when the present engine operating state satisfies a predetermined condition (e.g., a condition that the engine output is high, and the engine rotational speed is high). Therefore, ordinary common rail fuel injection may continue to be performed for a long time without using the pressure boosting unit, depending on the engine operating state. As a result, it may not be possible to perform correction of the injection characteristic of the fuel injection valve element at the time of boosted pressure rectangular injection and the correction of the pressure boosting characteristic of the pressure boosting unit at the time of boosted pressure delta injection.

Accordingly, in this embodiment, in a case where the ordinary common rail fuel injection (low pressure injection) continues to be performed for a predetermined time period or longer when the correction of the deviation of the fuel injection amount in each cylinder has not been completed, the pressure boosting unit is forcibly operated even when the pressure boosting unit should not be operated according to the engine operating state. Thus, in the aforementioned case, it is possible to perform the correction of the injection characteristic of the fuel injection valve element at the time of boosted pressure rectangular injection and the correction of the pressure boosting characteristic of the pressure boosting unit at the time of boosted pressure delta injection.

Thus, it is possible to promptly correct the deviation of the fuel injection amount in each cylinder, irrespective of the engine operating state. In this case, in order to prevent influence of the increase in the fuel injection pressure on the fuel injection amount, the fuel pressure in the common rail may be decreased in advance, and then the pressure boosting unit may be operated so as to prevent the excessive increase in the fuel injection pressure at the time of boosted pressure injection.

Figure 5:
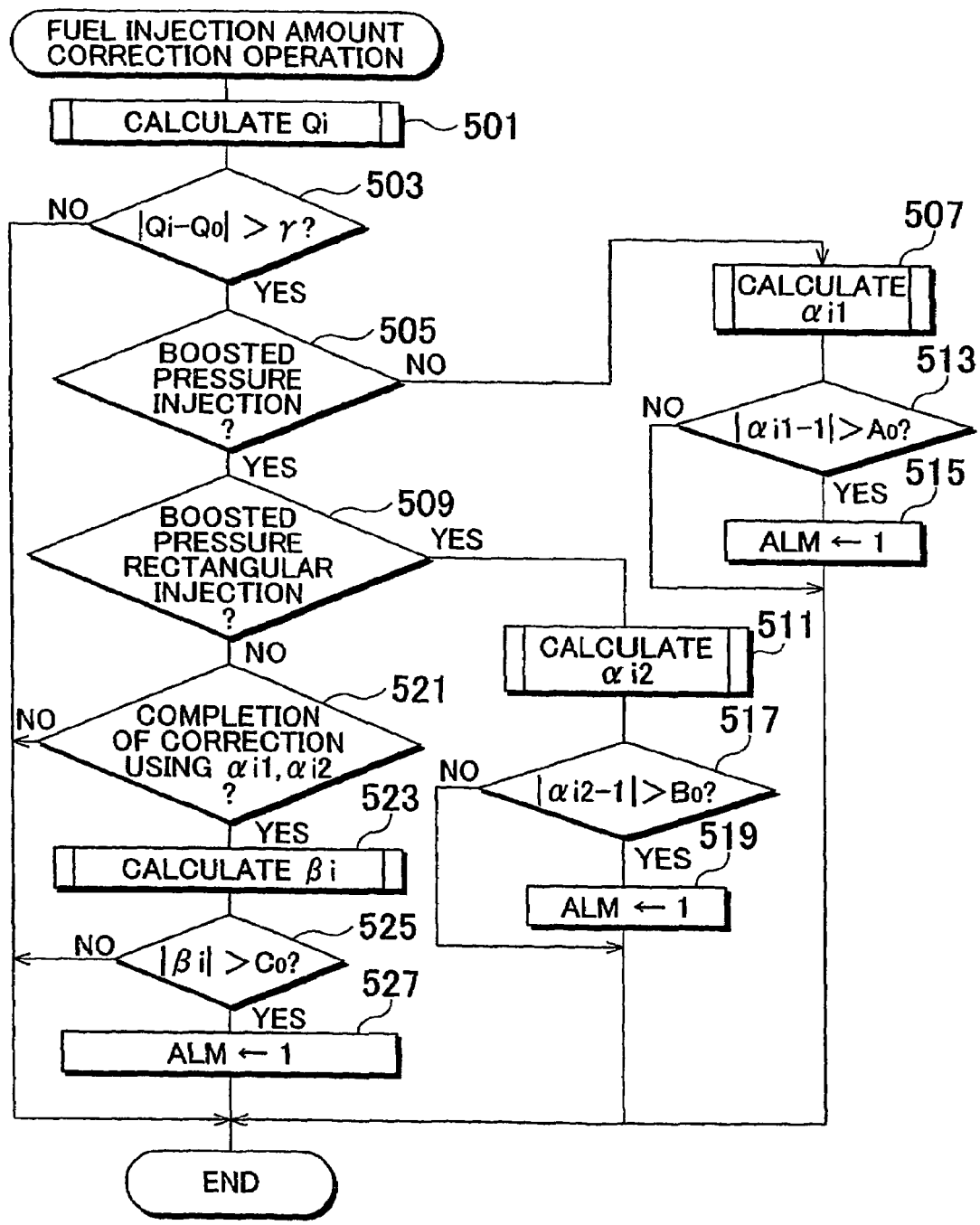
FIG. 5 is a flowchart explaining one example of fuel injection amount correction.

FIG. 5 is a flowchart which specifically explains one example of the aforementioned fuel injection amount correction. This operation is performed by the ECU 20. In this operation, the amount of fuel injected into each cylinder is detected. When the detected fuel injection amount is deviated from the reference value by a predetermined value or greater, that is, the deviation of the detected fuel injection amount is out of a permissible range, the characteristic of the fuel injection valve element and/or the characteristic of the pressure boosting element is corrected so that the deviation of the fuel injection amount in each cylinder becomes in the permissible range.

In the operation shown in FIG. 5, it is necessary to accurately detect the amount of fuel supplied to each cylinder. In order to accurately detect the fuel injection amount in each cylinder while the engine is operated, it is conceivable to provide a flowmeter in a fuel passage leading to the fuel injection valve. However, it is possible to employ a method in which the amount of generated heat in each cylinder during one stroke cycle is calculated based on the cylinder pressure detected by the cylinder pressure sensor 23 in each cylinder, as proposed in Japanese Patent Application No. JP-2003-19013 by the applicant of the invention. Hereinafter the method proposed in the Japanese Patent Application No. JP-2003-19013 will be briefly described.

Figure 6:
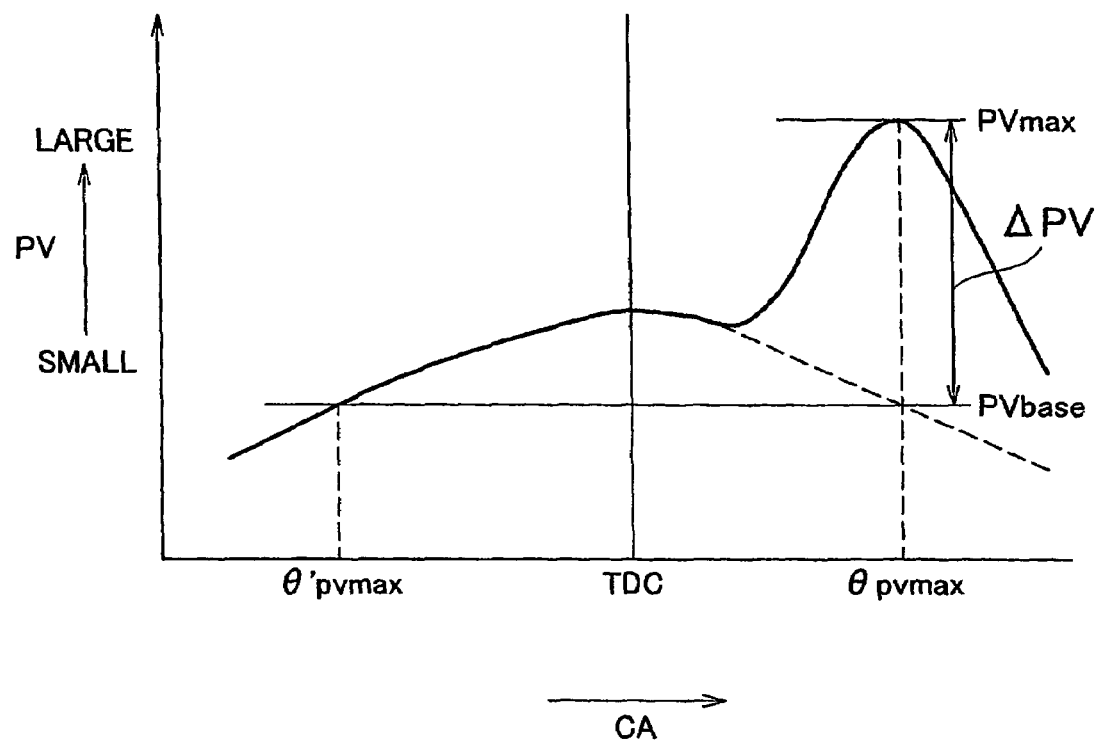
FIG. 6 is a graph explaining a principle of a method of calculating a fuel injection amount based on a change in a cylinder pressure.

FIG. 6 is a graph explaining a principle of a method of calculating the fuel injection amount in each cylinder based on a change in the cylinder pressure, which is employed in the operation shown in FIG. 5. In FIG. 6, a horizontal axis indicates a crank angle (CA) from a compression stroke to an expansion stroke of the cylinder, and a vertical axis indicates a value PV described later. In the horizontal axis, "TDC" indicates a top dead center during the compression stroke. In this embodiment, the value PV is defined as a product of a pressure P in the combustion chamber at each crank angle that is detected by the cylinder pressure sensor or the like, and a combustion chamber volume V at the crank angle (which is a function of the crank angle). That is, the value PV is represented by an equation, $PV = P \times V$.

In FIG. 6, a solid line indicates a change in the value PV at the time of actual combustion. As shown in FIG. 6, the value PV sharply increases when the combustion is started. After reaching the maximum value PVmax, the value PV sharply decreases. Since the value PV is a product of the pressure and the volume, the value PV is a value corresponding to a temperature in the cylinder at the crank angle, as represented by an equation of state of gas, $PV = GRT$ (G: mass of gas, R: gas constant (J/Kg×° K.), T: temperature (° K.)).

Accordingly, the maximum value PVmax of the value PV corresponds to the maximum combustion temperature in the cylinder. Also, as a result of experiment, it is found that timing (θpvmax in FIG. 6) at which the value PV reaches the maximum value PVmax corresponds to a time at which combustion of the fuel injected into the cylinder is completed (strictly speaking, combustion of 90% of the fuel is completed). Therefore, the timing θpvmax can be used as an indicator which indicates the time at which combustion is completed in the cylinder.

In FIG. 6, a dashed line indicates a change in the value PV in a case where combustion is not performed in the cylinder (i.e., PVbase). Since the change in the value PVbase shows compression and expansion of gas in the cylinder caused only by vertical movement of the piston, the change in the value PVbase is indicated by a curve symmetrical with respect to the top dead center. In this embodiment, a difference ΔPV is defined as a difference between the maximum value PVmax of the value PV and the value PVbase at the timing θpvmax (refer to FIG. 6). The value PVbase at the timing θpvmax can be easily calculated using the cylinder pressure and the cylinder volume when an intake stroke is completed, and the cylinder volume at the timing θpvmax.

As described above, the value PV indicates the temperature in the cylinder. Therefore, the value ΔPV is a difference between the maximum temperature in the cylinder (PVmax) when combustion is performed, and the temperature in the cylinder (PVbase) when combustion is not performed at all. Accordingly, the value ΔPV corresponds to energy generated in the cylinder due to combustion (i.e., the amount of generated heat), and is proportional to the amount of fuel burned in the combustion chamber.

Accordingly, if all of the fuel injected into the cylinder is burned, the fuel injection amount Q that is the amount of fuel injected into the cylinder can be calculated using the value ΔPV, according to an equation, $Q = K1 \times \Delta PV$. In this equation, K1 is a coefficient for converting the value PV to the fuel injection amount, and is obtained in advance through experiments or the like. In this embodiment, the cylinder pressure sensor is provided in each cylinder, and the aforementioned value ΔPV is calculated, whereby the fuel injection amount in each cylinder is calculated.

That is, in the fuel injection amount correction shown in FIG. 5, the fuel injection amount in one cylinder is calculated by the aforementioned method using the value PV. When the deviation of the calculated fuel injection amount from the reference value is not in the predetermined permissible range, the fuel injection amount of the fuel injection valve in the cylinder is corrected. By repeating this correction of the fuel injection amount in each cylinder, adjustment is performed such that the deviation of the fuel injection amount in each of all the cylinders becomes in the permissible range, and thus the deviation is reduced.

That is, in step 501 in FIG. 5, the cylinder pressure in a cylinder #i (in this embodiment, i=1 to 4) is recorded during one stroke cycle, and the aforementioned value ΔPV is calculated. Then, a fuel injection amount Qi is calculated based on the value ΔPV using the aforementioned equation for conversion.

In step 503, it is determined whether the deviation of the actual fuel injection amount Qi from the reference value $Q_0$ is greater than a predetermined permissible value γ. When it is determined that the deviation of the actual fuel injection amount Qi from the reference value $Q_0$ is equal to or less than the predetermined permissible value γ ($|Qi - Q_0| \leq \gamma$) in step 503, it is determined that the deviation of the fuel injection amount in this cylinder is in the permissible range. Therefore, step 505 and subsequent steps are not performed, and the operation is terminated. Also, when it is determined that the deviation of the actual fuel injection amount Qi from the reference value $Q_0$ is greater than the predetermined permissible value $\gamma (|Qi-Q_0|>\gamma)$ in step 503, it is determined whether the boosted injection is being performed in step 505. When it is determined that the boosted injection is not being performed in step 505, the correction of the injection characteristic of the fuel injection valve at the time of low pressure injection is performed, and the correction coefficient $\alpha i1$ of the fuel injection period at the time when the pressure is low is obtained in step 507.

When it is determined that the boosted pressure injection is being performed in step 505, it is determined whether the boosted pressure rectangular injection is being performed in step 509. When it is determined that the boosted pressure rectangular injection is being performed in step 509, the correction of the injection characteristic of the fuel injection valve element at the time of boosted pressure rectangular injection is performed, and the correction coefficient $\alpha i2$ of the fuel injection period at the time when the pressure is high is obtained in step 511.

In this embodiment, it is determined whether the calculated value $\alpha i1$ is excessively large or excessively small in step 513, and it is determined whether the calculated value $\alpha i2$ is excessively large or excessively small in step 517. When it is determined that the value $\alpha i1$ or $\alpha i2$ is excessively large or excessively small (i.e., when $|\alpha i1-1|$ is greater than a predetermined permissible value $A_0$ in step 513, or $|\alpha i2-1|$ is greater than a predetermined permissible value $B_0$ in step 517), it is determined that an abnormality has occurred in the fuel injection valve element, and an abnormality flag ALM is set to 1 (step 515 and step 519). When the value $\alpha i1$ or $\alpha i2$ is excessively large or excessively small, the correction amount of the fuel injection period is excessively large and exceeds a normal range. Therefore, it is considered that an abnormality has occurred in the fuel injection valve element. After the flag ALM is set to 1, a warning lamp provided in the vicinity of a driver's seat is turned on through operation that is performed separately. Thus, the driver is notified of occurrence of an abnormality.

When it is determined that the boosted pressure injection is being performed in step 505, and it is determined that the boosted pressure rectangular injection is not being performed in step 509, the boosted pressure delta injection is being performed in the engine. Accordingly, in this case, it is determined whether the correction of the injection characteristic of the fuel injection valve element (the correction of the fuel injection period using the correction coefficients $\alpha i1$ and $\alpha i2$) has already been completed in step 521. Only when it is determined that the correction of the injection characteristic of the fuel injection valve element has already been completed in step 521, step 523 is performed.

In step 523, the correction of the pressure boosting characteristic of the pressure boosting unit at the time of boosted pressure delta injection (i.e., the correction of the operation starting timing difference) is performed, and the correction amount $\beta i$ of the operation starting timing difference is calculated. In this case as well, when the correction amount $\beta i$ is greater than a permissible value $C_0$ (i.e., $\beta i>C_0$), it is determined that an abnormality has occurred in the pressure boosting unit, and the abnormality flag ALM is set to 1 in step 527.

In the example shown in FIG. 5, by repeating the operation in step 501 to step 527 for each cylinder, adjustment is performed such that the deviation of the fuel injection amount in each of all the cylinders from the reference value becomes in the permissible range. In the example shown in FIG. 5, the cylinder pressure sensor is provided in each cylinder, and the value PV is calculated, whereby the fuel injection amount in each cylinder is obtained. However, for example, the fuel injection amount in each cylinder may be calculated by detecting a degree of a pressure change (reduction) in the common rail 3 each time fuel is injected into each cylinder.

That is, when the fuel is injected from the fuel injection valve, the common rail 3 discharges the fuel of an amount that is substantially proportional to the fuel injection amount. Therefore, the pressure in the common rail 3 is reduced to the degree which is proportional to the amount of discharged fuel. Accordingly, it is possible to calculate the fuel injection amount of each fuel injection valve by detecting the degree of the pressure reduction in the common rail 3 each time the fuel is injected into each cylinder.

However, since the amount of fuel injected by each fuel injection valve one time is actually small as compared to the volume of the common rail 3, the degree of pressure reduction in the common rail 3 is small when the ordinary common rail injection (low pressure injection) is performed. Therefore, it may be difficult to accurately calculate the fuel injection amount.

As described with reference to FIG. 2, the pressure boosting control chamber 114b of the pressure boosting unit 110 discharges, through the pressure boosting control valve 111, the fuel of the amount obtained by multiplying the amount of fuel supplied to the fuel injection nozzle 105 from the pressure boosting chamber 114c (fuel injection amount) by the area ratio between the large-diameter piston portion and the small-diameter piston portion. The same amount of fuel flows into the hydraulic pressure chamber 114a of the pressure boosting unit 110 from the common rail 3.

That is, when the boosted pressure injection (i.e., the boosted pressure rectangular injection or the boosted pressure delta injection) is performed, since the common rail 3 discharges the fuel of the amount obtained by multiplying the fuel injection amount by the aforementioned area ratio, the degree of the pressure reduction at the time of fuel injection is large. Accordingly, when the boosted pressure fuel injection is performed, it is possible to accurately calculate the fuel injection amount of each fuel injection valve by measuring the degree of the pressure reduction in the common rail 3 at the time of fuel injection.

Next, fuel injection amount correction according to another embodiment will be described with reference to FIG. 7. In the embodiment shown in FIG. 5, the amount of fuel injected into each cylinder is detected, and the injection characteristic of the fuel injection valve element and the pressure boosting characteristic of the pressure boosting element are corrected such that the deviation of the fuel injection amount in each of all the cylinders from the reference value becomes in the predetermined permissible range. In order to perform this correction, it is necessary to accurately detect the fuel injection amount (absolute value of the fuel injection amount) in each cylinder. Accordingly, it is necessary to provide the cylinder pressure sensor 23 and the like.

Figure 7:
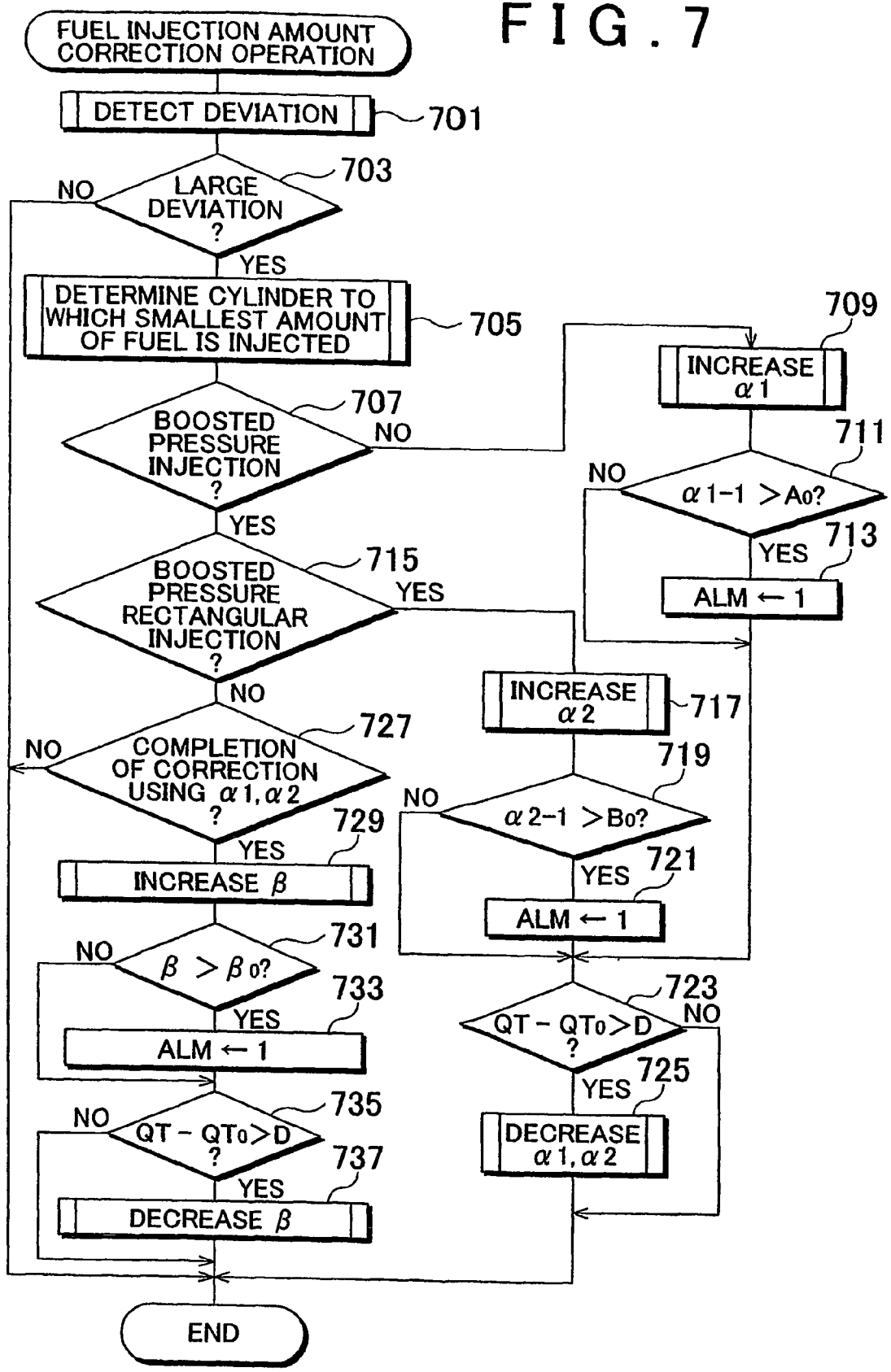
FIG. 7 is a flowchart explaining another example of fuel injection amount correction that is different from the fuel injection amount correction shown in FIG. 5.

Meanwhile, in the embodiment shown in FIG. 7, correction is performed such that the deviation of the fuel injection amount becomes in the permissible range, by detecting the relative relationship of magnitude among the fuel injection amounts in all the cylinders, instead of the absolute value of the fuel injection amount in each of all the cylinders.

In order to determine the relative relationship of magnitude among the fuel injection amounts in all the cylinders, for example, it is possible to employ a method in which a change in the rotational speed of the engine crankshaft is detected. In the stroke cycle of each cylinder, output torque is generated during a power stroke, and negative torque is generated during other strokes. Therefore, the crankshaft rotational speed is increased during the power stroke in each cylinder in one cycle of the engine. As the torque generated in the cycle becomes larger, the rotational speed is increased to a larger degree during the power stroke. Meanwhile, the output torque of each cylinder is increased according to the fuel injection amount in the cylinder. Therefore, the degree of the change (increase) in the crankshaft rotational speed during the power stroke of each cylinder is increased as the fuel injection amount is increased. In this embodiment, the crank angle sensor 25 (FIG. 1) detects the change in the crankshaft rotational speed during the power stroke of each cylinder. Based on the degree of the detected change in the crankshaft rotational speed, the deviation of the fuel injection amount is determined.

In FIG. 7, in step 701, operation of determining the deviation of the fuel injection amount is performed. In step 701, the crankshaft rotational speed during the power stroke of each cylinder is determined throughout one cycle of the engine, and the maximum rotational crankshaft speed during the power stroke of each cylinder is detected. The maximum crankshaft rotational speed during the power stroke in a cylinder corresponds to the fuel injection amount in the cylinder. In this embodiment, for example, a cylinder which makes the maximum crankshaft rotational speed during the power stroke highest among all the cylinders, and a cylinder which makes the maximum crankshaft rotational speed during the power stroke lowest among all the cylinders are detected. Then, the difference between the highest maximum crankshaft rotational speed during the power stroke and the lowest maximum crankshaft rotational speed during the power stroke is defined as the deviation.

In step 703, it is determined whether the deviation obtained as described above is excessively large. More specifically, when the value of the deviation obtained in step 701 (i.e., the difference between the highest maximum crankshaft rotational speed and the lowest maximum crankshaft rotational speed) is greater than a predetermined permissible value, it is determined that the deviation is excessively large. When the deviation is equal to or less than the permissible value in step 703, it is not necessary to adjust the fuel injection amount. Therefore, the present operation is terminated. When the deviation is greater than the permissible value, that is, when it is determined that the deviation is excessively large in step 703, next, a cylinder to which the smallest amount of fuel is injected among all the cylinders, that is, a cylinder which makes the maximum crankshaft rotational speed during the power stroke lowest among all the cylinders is determined.

Step 707 and subsequent steps are performed for the cylinder to which the smallest amount of fuel is injected among all the cylinders, which is determined in step 705. In this embodiment, the fuel injection amount in the determined cylinder to which the smallest amount of fuel is injected is gradually increased until the deviation becomes equal to or less than the permissible value in step 703. Thus, the deviation of the fuel injection amount in each cylinder is reduced.

That is, in step 707, it is determined whether the boosted pressure fuel injection is being performed in the engine. When it is determined that the boosted pressure fuel injection is not being performed (i.e., the ordinary common rail injection is being performed), the correction coefficient α1 of the fuel injection period at the time of low pressure injection is increased by a given amount in step 709 until the deviation becomes equal to or less than the permissible value in step 703. Then, as in the embodiment shown in FIG. 5, when it is determined that the correction coefficient α1 is excessively large in step 711, it is determined that an abnormality has occurred in the fuel injection valve element, and the abnormality flag ALM is set to 1 in step 713.

When it is determined that the boosted pressure injection is being performed in step 707, it is determined whether the boosted pressure rectangular injection is being performed in step 715. When it is determined that the boosted pressure rectangular injection is being performed in step 715, the correction coefficient α2 at the time of boosted pressure rectangular injection (high pressure injection) is increased by a given amount in step 717 until the deviation becomes equal to or less than the permissible value in step 703. In this case as well, when it is determined that the correction coefficient α2 is excessively large in step 719, it is determined that an abnormality has occurred in the fuel injection valve element, and the abnormality flag ALM is set to 1 in step 721.

Further, in this embodiment, after the fuel injection period is increased through the correction of the fuel injection period at the time of low pressure injection in step 709 to step 713, or through the correction of the fuel injection period at the time of boosted pressure rectangular injection in step 717 to step 721, it is determined whether a total fuel injection amount QT which is a total amount of the fuel injection amounts in all the cylinders is so large that the deviation of the total fuel injection amount QT from a reference value $QT_0$ is out of a permissible range D in step 723. When it is determined that the total fuel injection amount QT is so large that the deviation of the total fuel injection amount QT from a reference value $QT_0$ is out of the permissible range D in step 723, the fuel injection period of the fuel injection valve of each of all the cylinders is uniformly reduced by a predetermined value in step 725. Thus, it is possible to prevent the total fuel injection amount from being excessively increased in order to correct the deviation.

In step 723, it is necessary to detect the total fuel injection amount QT which is the total amount of the fuel injection amounts in all the cylinders. For example, the total fuel injection amount QT may be obtained by measuring the flow rate at an outlet of the fuel pump 5 (FIG. 1) (or may be estimated based on a set flow rate value of a variable volume mechanism of the fuel pump). Also, the total fuel injection amount QT may be estimated based on running resistance of a vehicle calculated based on a running speed.

In the case where it is determined that the boosted injection is being performed in step 707, and it is determined that the boosted pressure rectangular injection is not being performed in step 715, the correction of the characteristic of the pressure boosting element at the time of boosted pressure delta injection is performed in step 729 and subsequent steps only when it is determined that the correction of the fuel injection period has already been completed in step 727.

In this case as well, in step 729, the operation starting timing of the pressure boosting control valve 111 is gradually advanced until the deviation becomes equal to or less than the permissible value in step 703. Also, it is determined whether a correction amount (advance amount) β is excessively large, and is greater than a permissible amount $β_0$ in step 731. When it is determined that the correction amount β is excessively large, and is greater than the permissible amount $β_0$ in step 731, the abnormality flag ALM is set to 1 in step 733.

In step 735, it is determined whether the total fuel injection amount QT which is the total amount of the fuel injection amounts in all the cylinders after the correction is so large that the deviation of the total fuel injection amount QT from the reference value $QT_0$ is out of the permissible range D (i.e., the total fuel injection amount QT is greater than a value obtained by ($QT_0$+D), as in step 723. When it is determined that the total fuel injection amount QT is so large that the deviation of the total fuel injection amount QT from the reference value $QT_0$ is out of the permissible range D in step 735, the correction amount β is decreased by a predetermined amount in step 737 so as to prevent the total fuel injection amount from becoming excessively large. By performing the operation shown in FIG. 7, it is possible to perform adjustment such that the deviation of the fuel injection amount of each fuel injection valve becomes in the permissible range while the engine is operated, without measuring the absolute value of the fuel injection amount in each cylinder.

Figure 8:
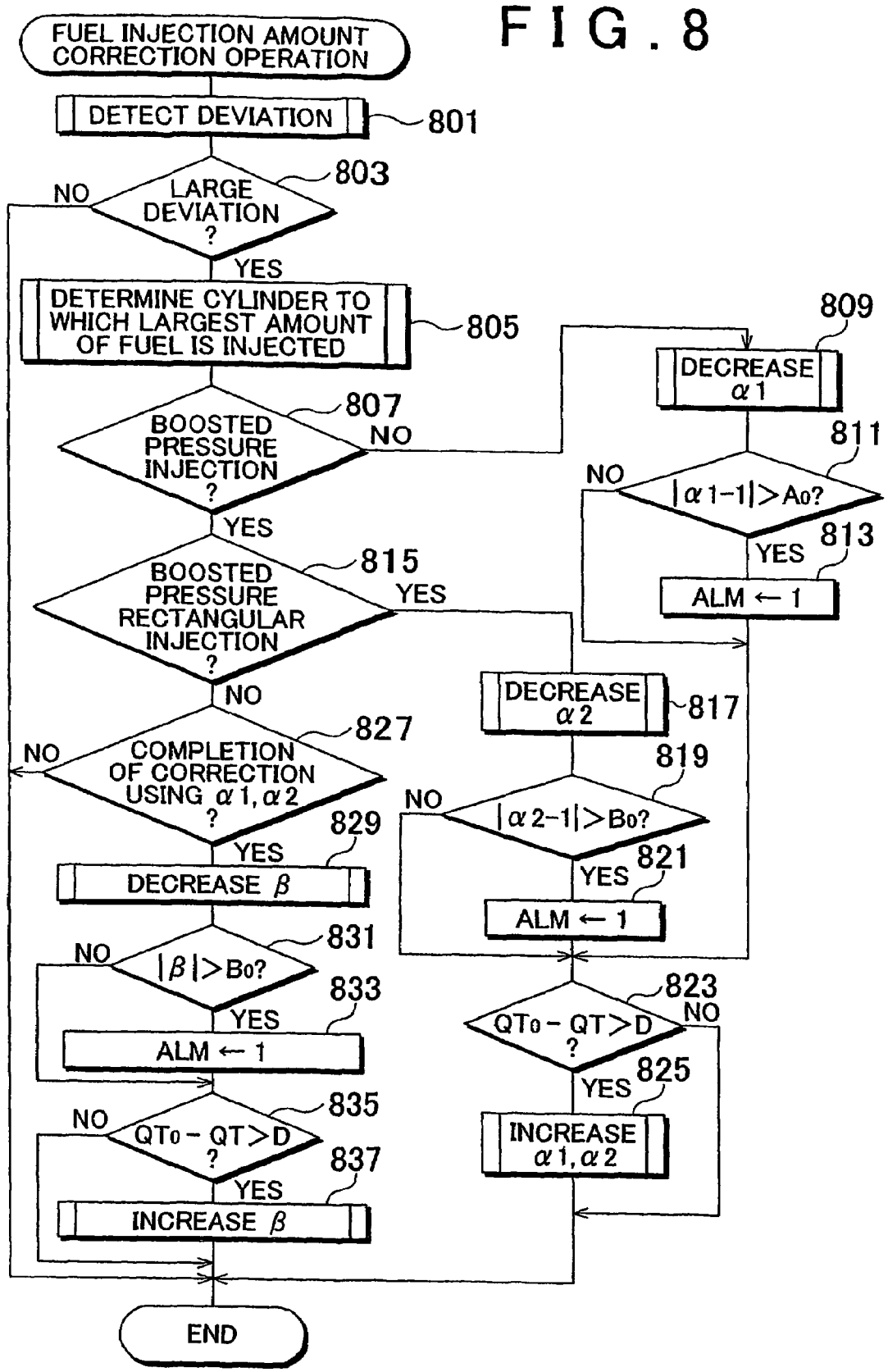
FIG. 8 is a flowchart explaining a modified example of fuel injection amount correction in FIG. 7.

In the operation shown in FIG. 7, when the deviation is large, the cylinder to which the smallest amount of fuel is injected among all the cylinders is selected (step 705), and the fuel injection amount in this cylinder is gradually increased, whereby the deviation is reduced. However, as shown in FIG. 8, a cylinder to which the largest amount of fuel is injected among all the cylinders may be selected (step 805), and the fuel injection amount in this cylinder may be gradually decreased so that the deviation is reduced.

In this case, in step 823 and in step 835, it is determined whether the total fuel injection amount QT after the correction is so small that the deviation of the total fuel injection amount QT from the reference value $QT_0$ is out of the permissible range D. When it is determined that the total fuel injection amount QT is so small that the deviation of the total fuel injection amount QT from the reference value $QT_0$ is out of the permissible range D in step 823 and in step 835, the fuel injection amount is increased in step 825 and in step 837.

The invention claimed is:

1. A fuel injection amount correction method for a pressure boosting fuel injection apparatus including i) a common rail that stores fuel having a predetermined pressure and supplies the fuel to a fuel injection valve; ii) a pressure boosting device that increases the pressure of the fuel to be supplied to the fuel injection valve from the common rail to a boosted pressure that is higher than the predetermined pressure; and iii) a first controller that opens the fuel injection valve and causes the fuel injection valve to inject the supplied fuel, the pressure boosting fuel injection apparatus controlling a fuel injection characteristic of the fuel injection valve by adjusting a difference between operation starting timing of the pressure boosting device and operation starting timing of the first controller when the pressure boosting device is in an operated state, the fuel injection amount correction method comprising the steps of:
   causing the first controller to be operated so as to perform fuel injection when the pressure boosting device is in the non-operated state; and
   correcting the fuel injection amount of the fuel injection valve when the fuel injection is performed based on a deviation between the actual fuel injection amount and a target fuel injection amount while the pressure boosting device is in the non-operated state.

2. The correction method according to claim 1, further comprising the step of correcting the operation starting timing of the pressure boosting device after the fuel injection amount of the fuel injection valve is corrected when the fuel injection is performed.

3. The correction method according to claim 1, wherein:
   the pressure boosting fuel injection apparatus includes a plurality of the fuel injection valves and a plurality of the first controllers; and
   an operating period of each of the first controllers is adjusted such that a deviation of the fuel injection amount of each of the fuel injection valves is reduced when the fuel injection amount is corrected.

4. A fuel injection amount correction method for a pressure boosting fuel injection apparatus including i) a common rail that stores fuel having a predetermined pressure and supplies the fuel to a fuel injection valve; ii) a pressure boosting device that increases the pressure of the fuel to be supplied to the fuel injection valve from the common rail to a target boosted pressure that is higher than the predetermined pressure of the fuel stored in the common rail; and iii) a first controller that opens the fuel injection valve and causes the fuel injection valve to inject the supplied fuel, the pressure boosting fuel injection apparatus controlling a fuel injection characteristic of the fuel injection valve by adjusting a difference between operation starting timing of the pressure boosting device and operation starting timing of the first controller when the pressure boosting device is in an operated state, the fuel injection amount correction method comprising the steps of:
   causing the first controller to be operated so as to perform fuel injection after the pressure of the fuel to be supplied to the fuel injection valve reaches the target boosted pressure after the pressure boosting device starts to be operated; and
   correcting the fuel injection amount of the fuel injection valve.

5. The correction method according to claim 4, further comprising the step of correcting the operation starting timing of the pressure boosting device after the fuel injection amount of the fuel injection valve is corrected when the fuel injection is performed.

6. The correction method according to claim 4, wherein:
   the pressure boosting fuel injection apparatus includes a plurality of the fuel injection valves and a plurality of the first controllers; and
   an operating period of each of the first controllers is adjusted such that a deviation of the fuel injection amount of each of the fuel injection valves is reduced when the fuel injection amount is corrected.

7. The correction method according to claim 6, wherein in a case where an adjustment amount by which the operating period of at least one of the first controllers is adjusted is greater than a predetermined value when the fuel injection amount is corrected, it is determined that an abnormality has occurred in the fuel injection valve corresponding to the first controller.

8. A fuel injection amount correction method for a pressure boosting fuel injection apparatus including i) a common rail that stores fuel having a predetermined pressure and supplies the fuel to a fuel injection valve; ii) a pressure boosting device that increases the pressure of the fuel to be supplied to the fuel injection valve from the common rail to a target boosted pressure that is higher than the predetermined pressure; and iii) a first controller that opens the fuel injection valve and causes the fuel injection valve to inject the supplied fuel, the pressure boosting fuel injection apparatus controlling a fuel injection characteristic of the fuel injection valve by adjusting a difference between operation starting timing of the pressure boosting device and operation starting timing of the first controller when the pressure boosting device is in an operated state, the fuel injection amount correction method comprising the steps of:
   causing the first controller to be operated so as to perform fuel injection before the pressure of the fuel to be supplied to the fuel injection valve reaches the target boosted pressure when the pressure boosting device is in the operated state; and correcting the operation starting timing of the pressure boosting device when the fuel injection is performed.

9. The correction method according to claim 8, wherein:
the pressure boosting fuel injection apparatus includes a plurality of the fuel injection valves, a plurality of the first controllers, and a plurality of the pressure boosting devices; and
the difference between the operation starting timing of the pressure boosting device and the operation starting timing of the first controller is adjusted for each of the fuel injection valves such that a deviation of the fuel injection amount of each of the fuel injection valves is reduced when the fuel injection amount is corrected.

10. The correction method according to claim 9, wherein in a case where an adjustment amount by which the difference between the operation starting timing of the pressure boosting device and the operation starting timing of the first controller is adjusted is greater than a predetermined value when the fuel injection amount is corrected, it is determined that an abnormality has occurred in the pressure boosting device.

11. The correction method according to claim 8, further comprising a pressure boosting controller that changes between fuel injection with the pressure boosting device being in the operated state, and fuel injection with the pressure boosting device being in the non-operated state, according to an engine operating state; and the fuel injection amount is corrected by operating the pressure boosting device for a time period required for correcting the fuel injection amount when the pressure boosting device should be maintained in the non-operated state by the pressure boosting controller according to the engine operating state.

12. A fuel injection amount correction method for a pressure boosting fuel injection apparatus including i) a common rail that stores fuel having a predetermined pressure and supplies the fuel to a fuel injection valve; ii) a pressure boosting device that includes a piston with a large diameter to which the pressure of the fuel in the common rail is applied, and a pressurizing piston with a small diameter which is connected to the piston with the large diameter, and which pressurizes the fuel to be supplied to the fuel injection valve from the common rail, the pressure boosting device that increases the pressure of the fuel to be supplied to the fuel injection valve from the predetermined pressure in the common rail to a boosted pressure that is higher than the predetermined pressure, using the pressurizing piston; and iii) a first controller that opens the fuel injection valve and causes the fuel injection valve to inject the supplied fuel, the pressure boosting fuel injection apparatus controlling a fuel injection characteristic of the fuel injection valve by adjusting a difference between operation starting timing of the pressure boosting device and operation starting timing of the first controller when the pressure boosting device is in an operated state, the fuel injection amount correction method comprising the steps of:
calculating the fuel injection amount of the fuel injection valve based on a change in the pressure of the fuel in the common rail when fuel injection is performed with the pressure of the fuel being boosted by the pressure boosting device; and
correcting the fuel injection amount of the fuel injection valve based on the calculated fuel injection amount.

13. A fuel injection amount correction apparatus for a pressure boosting fuel injection apparatus including i) a common rail that stores fuel having a predetermined pressure and supplies the fuel to a fuel injection valve; ii) a pressure boosting device that increases the pressure of the fuel to be supplied to the fuel injection valve from the common rail to a boosted pressure that is higher than the predetermined pressure; and iii) a first controller that opens the fuel injection valve and causes the fuel injection valve to inject the supplied fuel, the pressure boosting fuel injection apparatus controlling a fuel injection characteristic of the fuel injection valve by adjusting a difference between operation starting timing of the pressure boosting device and operation starting timing of the first controller when the pressure boosting device is in an operated state, the fuel injection amount correction apparatus comprising:
detecting or estimating an actual fuel injection amount while the pressure boosting device is in a non-operated state;
a second controller that causes the first controller to be operated so as to perform fuel injection when the pressure boosting device is in the non-operated state; and
a correcting device that corrects the fuel injection amount of the fuel injection valve when the fuel injection is performed based on a deviation between the actual fuel injection amount and a target fuel injection amount while the pressure boosting device is in the non-operated state.

14. A fuel injection amount correction apparatus for a pressure boosting fuel injection apparatus including i) a common rail that stores fuel having a predetermined pressure and supplies the fuel to a fuel injection valve; ii) a pressure boosting device that increases the pressure of the fuel to be supplied to the fuel injection valve from the common rail to a target boosted pressure that is higher than the predetermined pressure of the fuel stored in the common rail; and iii) a first controller that opens the fuel injection valve and causes the fuel injection valve to inject the supplied fuel, the pressure boosting fuel injection apparatus controlling a fuel injection characteristic of the fuel injection valve by adjusting a difference between operation starting timing of the pressure boosting device and operation starting timing of the first controller when the pressure boosting device is in an operated state, the fuel injection amount correction apparatus comprising:
a second controller that causes the first controller to be operated so as to perform fuel injection after the pressure of the fuel to be supplied to the fuel injection valve reaches the target boosted pressure after the pressure boosting device starts to be operated; and
a correcting device that corrects the fuel injection amount of the fuel injection valve.

15. A fuel injection amount correction apparatus for a pressure boosting fuel injection apparatus including i) a common rail that stores fuel having a predetermined pressure and supplies the fuel to a fuel injection valve; ii) a pressure boosting device that increases the pressure of the fuel to be supplied to the fuel injection valve from the common rail to a target boosted pressure that is higher than the predetermined pressure; and iii) a first controller that opens the fuel injection valve and causes the fuel injection valve to inject the supplied fuel, the pressure boosting fuel injection apparatus controlling a fuel injection characteristic of the fuel injection valve by adjusting a difference between operation starting timing of the pressure boosting device and operation starting timing of the first controller when the pressure boosting device is in an operated state, the fuel injection amount correction apparatus comprising:
a second controller that causes the first controller to be operated so as to perform fuel injection before the pressure of the fuel to be supplied to the fuel injection valve reaches the target boosted pressure when the pressure boosting device is in the operated state; and a correcting device that corrects the operation starting timing of the pressure boosting device when the fuel injection is performed.

16. A fuel injection amount correction apparatus for a pressure boosting fuel injection apparatus including i) a common rail that stores fuel having a predetermined pressure and supplies the fuel to a fuel injection valve; ii) a pressure boosting device including a piston with a large diameter to which the pressure of the fuel in the common rail is applied, and a pressurizing piston with a small diameter which is connected to the piston with the large diameter, and which pressurizes the fuel to be supplied to the fuel injection valve from the common rail, the pressure boosting device increasing the pressure of the fuel to be supplied to the fuel injection valve from the predetermined pressure in the common rail to a boosted pressure that is higher than the predetermined pressure, using the pressurizing piston; and iii) a first controller that opens the fuel injection valve and causes the fuel injection valve to inject the supplied fuel, the pressure boosting fuel injection apparatus controlling a fuel injection characteristic of the fuel injection valve by adjusting a difference between operation starting timing of the pressure boosting device and operation starting timing of the first controller when the pressure boosting device is in an operated state, the fuel injection amount correction apparatus comprising:

a calculating device that calculates the fuel injection amount of the fuel injection valve based on a change in the pressure of the fuel in the common rail when fuel injection is performed with the pressure of the fuel being boosted by the pressure boosting device; and a correcting device that corrects the fuel injection amount of the fuel injection valve based on the calculated fuel injection amount.

* * * * *